US011236846B1

(12) United States Patent
Glick et al.

(10) Patent No.: US 11,236,846 B1
(45) Date of Patent: Feb. 1, 2022

(54) FLUIDIC CONTROL: USING EXHAUST AS A CONTROL MECHANISM

(71) Applicant: Facebook Technologies, LLC, Menlo Park, CA (US)

(72) Inventors: Casey Glick, Redmond, WA (US); Andrew Arthur Stanley, Seattle, WA (US); Erik Samuel Roby, Redmond, WA (US); Jack Lindsay, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/508,614

(22) Filed: Jul. 11, 2019

(51) Int. Cl.
*F16K 99/00* (2006.01)
*G08B 6/00* (2006.01)

(52) U.S. Cl.
CPC ............ *F16K 99/0055* (2013.01); *G08B 6/00* (2013.01); *Y10T 137/87153* (2015.04); *Y10T 137/87161* (2015.04)

(58) Field of Classification Search
CPC ............ F16K 99/0055; F16K 31/1268; F16K 31/1262; F16K 31/1266; F16K 99/0015; F16K 7/123; F16K 7/17; F16K 99/0059; F16K 2099/0001; F16K 2099/0082; G08B 6/00; Y10T 137/87153; Y10T 137/87161
USPC .................................. 251/331, 61.2
See application file for complete search history.

(56) References Cited

U.S. PATENT DOCUMENTS

| | | | | |
|---|---|---|---|---|
| 2,577,967 A | * | 12/1951 | Hughes | F16K 31/365 251/25 |
| 2,659,381 A | * | 11/1953 | Seljos | F15B 3/00 137/85 |
| 3,042,072 A | * | 7/1962 | Humphrey | F15C 3/04 137/454.6 |
| 3,076,477 A | * | 2/1963 | Brandenberg | F16K 31/365 137/625.6 |
| 3,463,442 A | * | 8/1969 | Leskiewicz | F15C 5/00 251/61.2 |
| 3,470,910 A | * | 10/1969 | Loveless | F16K 31/385 137/625.6 |
| 3,559,945 A | * | 2/1971 | Coiner | F15C 3/04 251/61.2 |
| 3,601,155 A | * | 8/1971 | Brown | F15C 3/04 251/29 |
| 3,604,460 A | * | 9/1971 | Delrue | F15C 3/02 137/625.66 |

(Continued)

*Primary Examiner* — Marina A Tietjen
*Assistant Examiner* — Frederick D Soski
(74) *Attorney, Agent, or Firm* — FisherBroyles, LLP

(57) ABSTRACT

The disclosed apparatus may include a fluidic channel connecting an inlet port and an outlet port. The apparatus may further include a gate transmission element configured to limit fluid flow between the inlet port and the outlet port. Still further, the apparatus may include a primary gate terminal connected to a second fluidic inlet port, where pressure or force at the primary gate may at least partially control movement of the gate transmission element. The apparatus may also include a secondary gate terminal connected to the second fluidic inlet port. Pressure or force at the secondary gate may at least partially control movement of the gate transmission element. Various other associated methods, systems, and computer-readable media are also disclosed.

27 Claims, 18 Drawing Sheets

(56) References Cited

U.S. PATENT DOCUMENTS

| | | | | | |
|---|---|---|---|---|---|
| 3,618,891 A * | 11/1971 | Topfer | F16K 31/1268 | | |
| | | | 251/61.2 | | |
| 3,653,408 A * | 4/1972 | Coiner | F15C 3/04 | | |
| | | | 137/625.6 | | |
| 3,689,025 A * | 9/1972 | Kiser | F16K 7/16 | | |
| | | | 251/25 | | |
| 3,762,430 A * | 10/1973 | Maercklein | G05D 11/006 | | |
| | | | 137/98 | | |
| 3,763,893 A * | 10/1973 | Kriegel | F16K 31/56 | | |
| | | | 137/625.6 | | |
| 3,776,277 A * | 12/1973 | Nagashima | H01H 35/24 | | |
| | | | 137/625.6 | | |
| 3,897,041 A * | 7/1975 | Cowan | F15C 3/04 | | |
| | | | 251/61.1 | | |
| 3,934,611 A * | 1/1976 | Gachot | F15C 3/04 | | |
| | | | 137/884 | | |
| 4,228,777 A * | 10/1980 | Haase | F02M 69/20 | | |
| | | | 123/452 | | |
| 4,794,940 A * | 1/1989 | Albert | F16K 31/1266 | | |
| | | | 137/1 | | |
| 4,852,851 A * | 8/1989 | Webster | F16K 7/17 | | |
| | | | 251/61.1 | | |
| 4,858,883 A * | 8/1989 | Webster | F16K 7/17 | | |
| | | | 251/61.1 | | |
| 5,161,775 A * | 11/1992 | Miller | F16K 31/128 | | |
| | | | 251/30.05 | | |
| 5,284,319 A * | 2/1994 | Baumann | F16K 7/02 | | |
| | | | 251/214 | | |
| 5,660,370 A * | 8/1997 | Webster | F16K 7/17 | | |
| | | | 137/884 | | |
| 5,931,187 A * | 8/1999 | Williams | F16K 31/1266 | | |
| | | | 137/487.5 | | |
| 6,357,335 B1 * | 3/2002 | Lafler | B60T 13/683 | | |
| | | | 91/459 | | |
| 6,386,509 B1 * | 5/2002 | Mastuzawa | G05D 16/0672 | | |
| | | | 251/61.2 | | |
| 7,150,444 B2 * | 12/2006 | Ohmi | F16K 25/005 | | |
| | | | 251/118 | | |
| 7,299,818 B2 * | 11/2007 | Pinter | G01F 1/6842 | | |
| | | | 137/15.18 | | |
| 7,637,284 B1 * | 12/2009 | Feldmeier | F16K 11/20 | | |
| | | | 137/883 | | |
| 8,256,740 B2 * | 9/2012 | Nakakubo | H01M 8/04201 | | |
| | | | 251/61.2 | | |
| 8,337,777 B2 * | 12/2012 | Nurse | B01L 3/502738 | | |
| | | | 422/503 | | |
| 9,033,683 B2 * | 5/2015 | Kodama | F16K 24/04 | | |
| | | | 417/413.1 | | |
| 9,321,051 B2 * | 4/2016 | Kim | F16K 99/0015 | | |
| 10,338,611 B2 * | 7/2019 | Yoo | G05D 16/166 | | |
| 10,502,327 B1 * | 12/2019 | Keller | F16K 7/075 | | |
| 10,527,177 B2 * | 1/2020 | Vu | F16K 41/103 | | |
| 2002/0117517 A1 * | 8/2002 | Unger | F16K 99/0017 | | |
| | | | 222/214 | | |
| 2002/0117643 A1 * | 8/2002 | Winger | F15C 5/00 | | |
| | | | 251/129.06 | | |
| 2002/0124897 A1 * | 9/2002 | Bergh | F16K 99/0059 | | |
| | | | 137/885 | | |
| 2002/0127146 A1 * | 9/2002 | Bergh | F16K 99/0059 | | |
| | | | 422/89 | | |
| 2003/0025099 A1 * | 2/2003 | Nakata | F16K 7/16 | | |
| | | | 251/331 | | |
| 2003/0042459 A1 * | 3/2003 | Gregoire | F16K 27/0236 | | |
| | | | 251/331 | | |
| 2003/0071235 A1 * | 4/2003 | Gamble | F15C 5/00 | | |
| | | | 251/61.1 | | |
| 2003/0141473 A1 * | 7/2003 | Pelrine | F16K 99/0015 | | |
| | | | 251/129.06 | | |
| 2003/0146401 A1 * | 8/2003 | Wetzel | F16K 99/0001 | | |
| | | | 251/61.1 | | |
| 2003/0155541 A1 * | 8/2003 | Sheydayi | F16K 7/17 | | |
| | | | 251/61 | | |
| 2003/0156953 A1 * | 8/2003 | Chinn | F04B 19/24 | | |
| | | | 417/322 | | |
| 2003/0201416 A1 * | 10/2003 | Miles | F16K 99/0001 | | |
| | | | 251/61.2 | | |
| 2003/0215342 A1 * | 11/2003 | Higashino | F04B 43/043 | | |
| | | | 417/322 | | |
| 2003/0234376 A1 * | 12/2003 | Cabuz | F16K 99/0051 | | |
| | | | 251/129.01 | | |
| 2004/0075073 A1 * | 4/2004 | Claydon | B81C 1/00492 | | |
| | | | 251/331 | | |
| 2004/0108479 A1 * | 6/2004 | Garnier | F16K 99/0038 | | |
| | | | 251/129.01 | | |
| 2004/0115731 A1 * | 6/2004 | Hansen | C30B 29/54 | | |
| | | | 506/12 | | |
| 2005/0104021 A1 * | 5/2005 | Meyers | F16K 31/50 | | |
| | | | 251/81 | | |
| 2005/0109973 A1 * | 5/2005 | Glime | F16K 7/16 | | |
| | | | 251/331 | | |
| 2005/0127311 A1 * | 6/2005 | Shorey | F16K 7/17 | | |
| | | | 251/61.1 | | |
| 2005/0211944 A1 * | 9/2005 | Tutt | F16K 7/14 | | |
| | | | 251/331 | | |
| 2006/0177330 A1 * | 8/2006 | Hargraves | F04B 39/14 | | |
| | | | 417/566 | | |
| 2006/0255306 A1 * | 11/2006 | Scheibe | F16K 7/16 | | |
| | | | 251/331 | | |
| 2007/0023719 A1 * | 2/2007 | Shannon | F16K 99/0005 | | |
| | | | 251/129.01 | | |
| 2007/0026269 A1 * | 2/2007 | Nakakubo | H01M 8/04089 | | |
| | | | 137/859 | | |
| 2007/0051412 A1 * | 3/2007 | Heath | F16K 99/0026 | | |
| | | | 137/561 R | | |
| 2007/0117201 A1 * | 5/2007 | Kweon | F16K 99/0001 | | |
| | | | 435/288.3 | | |
| 2007/0200081 A1 * | 8/2007 | Elizarov | F16K 99/0001 | | |
| | | | 251/331 | | |
| 2007/0234785 A1 * | 10/2007 | Beerling | B01L 3/502746 | | |
| | | | 73/61.56 | | |
| 2008/0041259 A1 * | 2/2008 | Broyer | F16K 99/0015 | | |
| | | | 102/202.11 | | |
| 2008/0110506 A1 * | 5/2008 | Igarashi | G05D 16/185 | | |
| | | | 137/488 | | |
| 2008/0157015 A1 * | 7/2008 | Daido | F16K 31/60 | | |
| | | | 251/80 | | |
| 2008/0202606 A1 * | 8/2008 | O'Hara | F16K 7/123 | | |
| | | | 137/551 | | |
| 2008/0264863 A1 * | 10/2008 | Quake | F16K 99/0026 | | |
| | | | 210/651 | | |
| 2009/0095363 A1 * | 4/2009 | Nakakubo | F16K 99/0059 | | |
| | | | 137/843 | | |
| 2009/0152486 A1 * | 6/2009 | Bong | G05D 16/0655 | | |
| | | | 251/129.01 | | |
| 2009/0162707 A1 * | 6/2009 | Nakakubo | H01M 8/04201 | | |
| | | | 429/515 | | |
| 2009/0206293 A1 * | 8/2009 | Beerling | F16K 99/0059 | | |
| | | | 251/331 | | |
| 2009/0308461 A1 * | 12/2009 | Rohl | A62C 27/00 | | |
| | | | 137/14 | | |
| 2009/0314365 A1 * | 12/2009 | McAvoy | F16K 99/0001 | | |
| | | | 137/637 | | |
| 2010/0243078 A1 * | 9/2010 | Yoo | F16K 99/0015 | | |
| | | | 137/468 | | |
| 2011/0162785 A1 * | 7/2011 | Zhou | B29C 66/953 | | |
| | | | 156/196 | | |
| 2011/0233443 A1 * | 9/2011 | Kamada | C22C 19/055 | | |
| | | | 251/331 | | |
| 2011/0240127 A1 * | 10/2011 | Eberhart | F16K 99/0059 | | |
| | | | 137/1 | | |
| 2012/0025113 A1 * | 2/2012 | Stadelbauer | F16K 31/002 | | |
| | | | 251/11 | | |
| 2012/0055555 A1 * | 3/2012 | Saint-Paul | F16K 7/14 | | |
| | | | 137/1 | | |
| 2012/0138836 A1 * | 6/2012 | Kanai | F16K 1/123 | | |
| | | | 251/331 | | |
| 2012/0208102 A1 * | 8/2012 | Schumm, Jr. | F16K 99/0015 | | |
| | | | 429/444 | | |

(56) References Cited

U.S. PATENT DOCUMENTS

| | | | |
|---|---|---|---|
| 2012/0298233 A1* | 11/2012 | Rothacher | F16K 99/0061 137/613 |
| 2013/0000759 A1* | 1/2013 | Killeen | F04B 49/03 137/565.16 |
| 2013/0015377 A1* | 1/2013 | Gamache | F16K 31/126 251/12 |
| 2013/0045144 A1* | 2/2013 | Perozziello | F16K 99/0059 422/502 |
| 2013/0150779 A1* | 6/2013 | Field | A61F 9/00781 604/9 |
| 2013/0199646 A1* | 8/2013 | Brammer | B01L 3/502738 137/831 |
| 2013/0204177 A1* | 8/2013 | Field | F16K 31/1266 604/9 |
| 2013/0255801 A1* | 10/2013 | Hirata | F16K 31/126 137/505.14 |
| 2013/0257776 A1* | 10/2013 | Tissot | H02K 33/16 345/173 |
| 2013/0334449 A1* | 12/2013 | Muci | F16K 7/17 251/324 |
| 2013/0341550 A1* | 12/2013 | Fukano | F16K 7/12 251/331 |
| 2015/0021501 A1* | 1/2015 | Ono | B01L 3/502738 251/61 |
| 2015/0300526 A1* | 10/2015 | Livermore-Clifford | F16K 99/0048 251/12 |
| 2015/0369370 A1* | 12/2015 | Tanikawa | F16K 7/17 251/14 |
| 2016/0053899 A1* | 2/2016 | Glime | F16K 7/16 251/331 |
| 2016/0208676 A1* | 7/2016 | de Andrade Filho | F01P 7/16 |
| 2016/0319945 A1* | 11/2016 | Yoshida | F16K 7/17 |
| 2017/0009785 A1* | 1/2017 | McEvoy | F15B 15/1433 |
| 2017/0086321 A1* | 3/2017 | de Jong | H05K 5/0213 |
| 2017/0284244 A1* | 10/2017 | Bock | F16K 7/17 |
| 2018/0012735 A1* | 1/2018 | Sawachi | H01J 37/32165 |
| 2018/0043359 A1* | 2/2018 | Lin | F16K 99/0059 |
| 2018/0099280 A1* | 4/2018 | Schmolke | F16K 99/0034 |
| 2019/0101943 A1* | 4/2019 | Metschke | F15B 13/0433 |
| 2021/0262576 A1* | 8/2021 | Suzuki | F16K 7/123 |

* cited by examiner

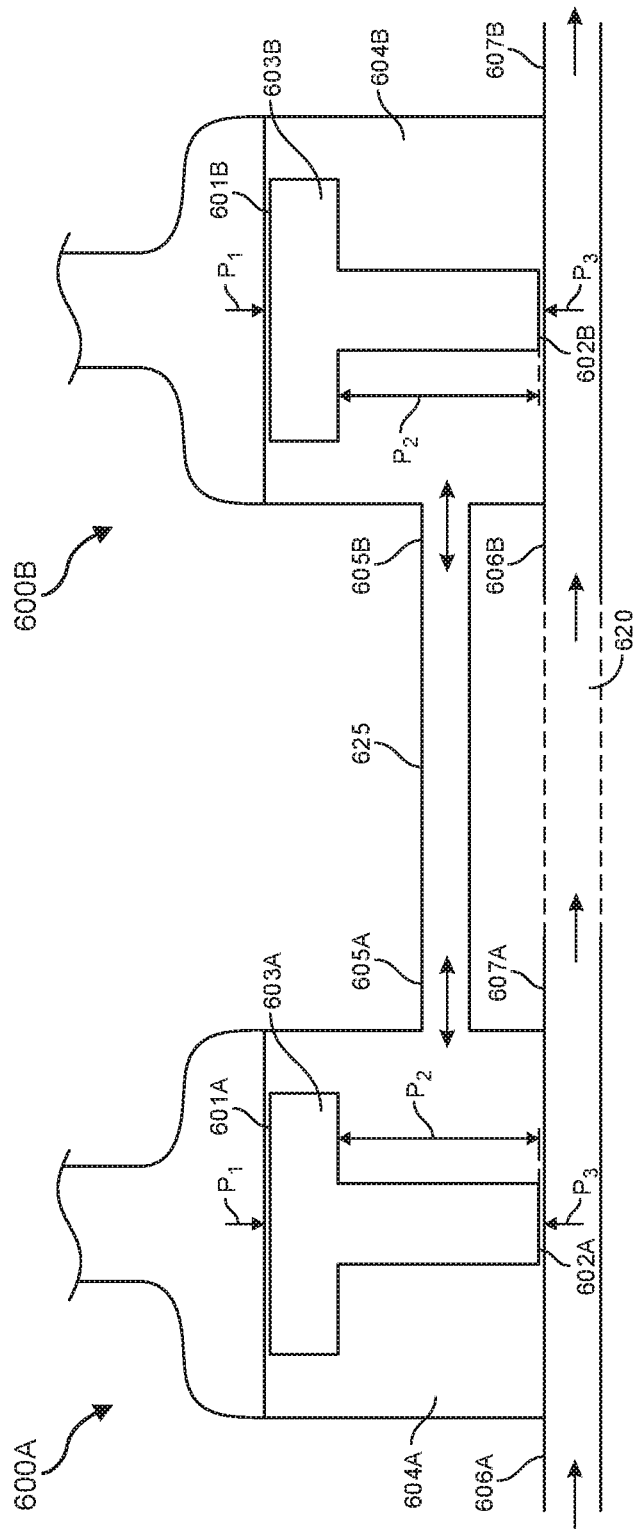

FLUIDIC CONTROL: USING EXHAUST AS A CONTROL MECHANISM

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 10 is an illustration of an embodiment in which exhaust from one apparatus is used to control pressure or force applied to another apparatus.

Figure 1:
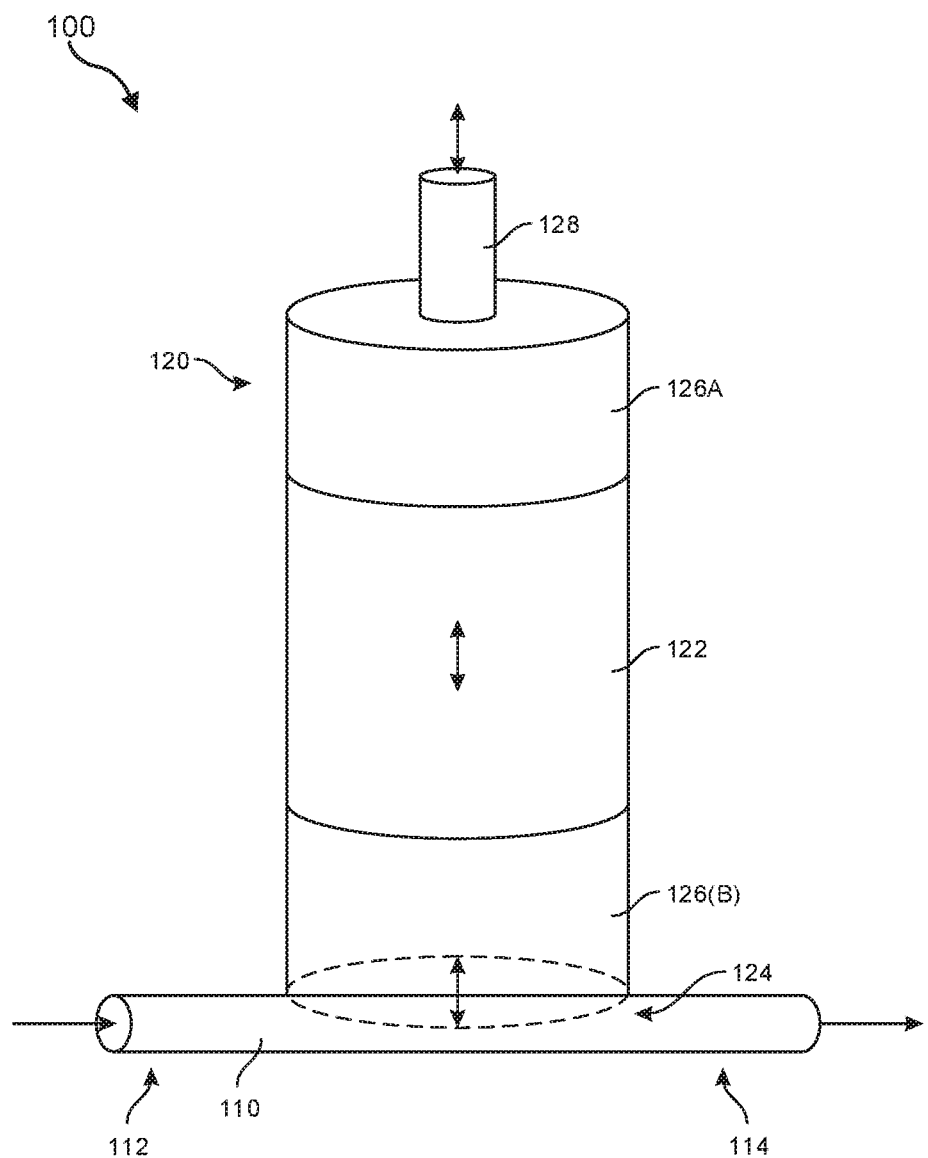
FIG. 1 is an illustration of an exemplary fluidic control system that may be used in connection with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems, methods, and apparatuses for using exhaust as a control mechanism to control microfluidic valves. Microfluidic control valves may come in a variety of different types including normally open valves, normally closed valves, complimentary or three-way valves, and other types of valves. Normally open valves, as implied by the name, are open valves that allow fluid to flow from an inlet to an outlet. These valves stay open unless acted upon by another force or pressure. Normally closed valves, on the other hand, are typically preloaded with a force or pressure that causes the valve to be closed, preventing fluid from flowing from the inlet to the outlet. These valves typically stay closed unless acted upon by another force or pressure which causes the valve to open and allows fluid to flow from inlet to outlet.

In some embodiments, these microfluidic control valves include exhaust ports or exhaust outlets. These exhaust channels may allow internal pressures to be released to another environment such as the traditional atmosphere in a room or outdoors. In some cases, these exhaust ports may lead to other devices or other microfluidic control valves. In some of the embodiments described herein, a pressure or force may be applied at the exhaust port. An applied pressure at the exhaust port may cause pressures and/or forces within the microfluidic control valve to change. In the case of a normally open valve, this pressure at the exhaust port may cause a closed valve to open. In the case of a normally closed valve, pressure at the exhaust port may cause a closed valve to open. Accordingly, an input pressure applied in an exhaust channel (or in another input channel) may allow modulation of the microfluidic control valve, including valve elements such as gate transmission elements, gate terminals, or other elements. These and other features of microfluidic control valves are introduced initially in FIGS. 1-5 and are explained further in FIGS. 6-15. FIGS. 16-21 describe various embodiments in which the microfluidic control valves described herein may be used in artificial reality systems including haptics systems.

At least some of the embodiments described herein may include haptic fluidic systems that involve the control (e.g., stopping, starting, restricting, increasing, etc.) of fluid flow through a fluid channel. The control of fluid flow may be accomplished with a fluidic valve. FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism, another fluid channel, or a fluid reservoir.

Fluidic valve 100 may include a gate 120 for controlling the fluid flow through fluid channel 110. Gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to gate transmission element 122 may result in opening restricting region 124 to allow or increase flow through the fluid channel 110. The force, pressure, or displacement applied to gate transmission element 122 may be referred to as a gate force, gate pressure, or gate displacement. Gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, gate 120 of fluidic valve 100 may include one or more gate terminals, such as an input gate terminal 126A and an output gate terminal 126B (collectively referred to herein as "gate terminals 126") on opposing sides of gate transmission element 122. Gate terminals 126 may be elements for applying a force (e.g., pressure) to gate transmission element 122. By way of example, gate terminals 126 may each be or include a fluid chamber adjacent to gate transmission element 122. Alternatively or additionally, one or more of gate terminals 126 may include a solid component, such as a lever, screw, or piston, that is configured to apply a force to gate transmission element 122.

In some examples, a gate port 128 may be in fluid communication with input gate terminal 126A for applying a positive or negative fluid pressure within the input gate terminal 126A. A control fluid source (e.g., a pressurized fluid source, a fluid pump, etc.) may be in fluid communication with gate port 128 to selectively pressurize and/or depressurize input gate terminal 126A. In additional embodiments, a force or pressure may be applied at the input gate terminal 126A in other ways, such as with a piezoelectric element or an electromechanical actuator, etc.

In the embodiment illustrated in FIG. 1, pressurization of the input gate terminal 126A may cause the gate transmission element 122 to be displaced toward restricting region 124, resulting in a corresponding pressurization of output gate terminal 126B. Pressurization of output gate terminal 126B may, in turn, cause restricting region 124 to partially or fully restrict to reduce or stop fluid flow through the fluid channel 110. Depressurization of input gate terminal 126A may cause gate transmission element 122 to be displaced away from restricting region 124, resulting in a corresponding depressurization of the output gate terminal 126B. Depressurization of output gate terminal 126B may, in turn, cause restricting region 124 to partially or fully expand to allow or increase fluid flow through fluid channel 110. Thus, gate 120 of fluidic valve 100 may be used to control fluid flow from inlet port 112 to outlet port 114 of fluid channel 110.

Figure 2:
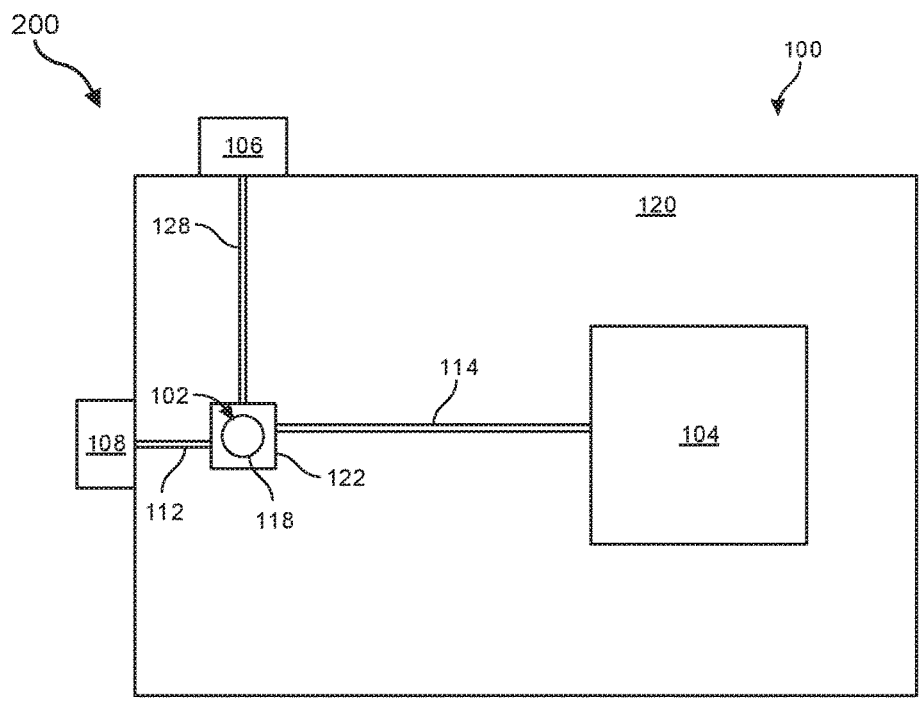
FIG. 2 is a schematic top view of a microfluidic system, according to at least one embodiment of the present disclosure.

FIG. 2 is a schematic top view of a microfluidic system 100 that includes a microfluidic valve 102, a fluid-driven mechanism 104 configured to be activated by the microfluidic valve 102, a drive fluid source 106 for driving the microfluidic valve 102, and a subject fluid source 108 for flowing a subject fluid to activate the fluid-driven mechanism 104. The flow of the subject fluid may be controlled by a gate of the microfluidic valve 102. A gate port 128 may provide fluid communication between the drive fluid source 106 and the microfluidic valve 102. An inlet port 112 may provide fluid communication between the subject fluid source 108 and the microfluidic valve 102. An outlet port 114 may provide fluid communication between the microfluidic valve 102 and the fluid-driven mechanism 104. The microfluidic valve 102 may include a plunger that may be movable within a cavity 118 to open and close the microfluidic valve 102 for controlling flow of the subject fluid.

The microfluidic system 100 may include a substrate 120, within which or on which at least some of the components of the microfluidic system 100 are disposed. For example, at least a portion of the substrate 120 may define one or more of a valve body 122 of the microfluidic valve 102, the drive fluid source 106, the subject fluid source 108, the gate port 128, the inlet port 112, the outlet port 114, the cavity 118, and/or the fluid-driven mechanism 104. In some embodiments, the substrate 120 may include a stack of materials, such as a drive body portion, at least one flexible material (e.g., an elastic material), a gate body portion, and/or a fluid channel body portion. In some examples, the term "flexible" may mean capable of flexing and/or returning to an original state without permanent damage. A flexible material may also be stretchable. In some examples, the substrate 120 may include at least one of silicon, silicon dioxide, a glass, and/or a rigid polymer (e.g., a polycarbonate material, an acrylic material, a urethane material, a fluorinated elastomer material, a polysiloxane material, etc.).

The fluid-driven mechanism 104 may be any mechanism that may be driven or controlled by flowing and/or pressurization of the subject fluid at a microfluidic scale. By way of example and not limitation, the fluid-driven mechanism 104 may include at least one of a microelectromechanical device (e.g., a so-called "MEMS" device), an expansible cavity, a piston system, and/or a haptic feedback device. Each of the drive fluid source 106 and the subject fluid source 108 may be any source or mechanism that can provide a pressurized fluid (e.g., gas (e.g., air, nitrogen, etc.) or liquid (e.g., water, oil, etc.) to the microfluidic valve 102. By way of example and not limitation, the drive fluid source 106 and the subject fluid source 108 may each be or include a pressurized reservoir, a fan, a pump, or a piston system, etc.

Optionally, in some embodiments, an exhaust outlet may be in fluid communication with the microfluidic valve 102. The exhaust outlet may enable one or more chambers within the microfluidic valve 102 to expand and/or contract as the plunger is moved back and forth to open or close the microfluidic valve 102, as will be explained in further detail below.

In some embodiments, the microfluidic system 100 may be incorporated in a haptic feedback device, such as for use with an artificial reality (e.g., virtual reality, augmented reality, mixed reality, or hybrid reality) system. The microfluidic system 100 may be positioned on or in a wearable device (e.g., a headband, a head-mounted display, a glove, an armband, etc.) that is configured to provide haptic feedback (e.g., vibration, pressure, etc.) to a user. For example, the fluid-driven mechanism 104 of the microfluidic system 100 may be an expansible cavity configured to fill and expand with the subject fluid upon opening of the microfluidic valve 102. The expanding cavity may press against the user, and the user may sense the pressure from the expanding cavity, such as resulting from an action taken by the user in the artificial reality.

By way of example, the microfluidic system 100 may be incorporated in a finger of a glove, and the user may use his or her finger in space to make a selection in an artificial reality environment. The expansible cavity of the microfluidic system 100 may be filled and expanded with the subject fluid to provide a pressure point on the user's finger to confirm the selection made by the user. The pressure point may provide a sensation that the user is touching a real object. Alternatively, the fluid-driven mechanism 104 may include an eccentric rotating element that may be rotated by the flowing subject fluid when the microfluidic valve 102 is in an open state, resulting in a vibrating sensation as haptic feedback for the user. Examples of architectures that may be used for the microfluidic valve 102 are described below in connection with FIGS. 3A-5 below.

FIGS. 3A-5 illustrate various views of a microfluidic valve 200 according to at least one embodiment of the present disclosure. The microfluidic valve 200 shown in FIGS. 3A5 may be used as the microfluidic valve 102 of the microfluidic system 100 shown in FIG. 2, for example.

The microfluidic valve 200 may include a gate port 210 for controlling a gate 211. The gate 211 may control flow of a subject fluid through a fluid channel from an inlet port 212 to an outlet port 214. The gate port 210, inlet port 212, and outlet port 214 may each pass through a valve body 222 and into a cavity 218 formed in the valve body 222. The cavity 218 may be divided into an input gate terminal 230 and an output gate terminal 232 separated by a flexible membrane 234. The gate port 210 may be in fluid communication with the input gate terminal 230. A plunger 216 may be disposed within the cavity 218 and may be configured to move back and forth (e.g., up and down from the perspective of FIGS. 3A, 4, and 5) to open and close the microfluidic valve 200. The plunger 216 may be coupled to (e.g., adhered to, chemically bonded to, fastened to) the flexible membrane 234. The plunger 216 and the flexible membrane 234 may together define a gate transmission element of the microfluidic valve 200. The flexible membrane 234 may be formed of a polymer (e.g., an elastomeric material, such as a polysiloxane material).

In some embodiments, a flexible bubble 236 may be positioned within the output gate terminal 232, over the inlet port 212 and the outlet port 214, and between the plunger and the inlet port 212 and outlet port 214. The flexible bubble 236 may be formed of a polymer (e.g., an elastomeric material, such as a polysiloxane material). The flexible bubble 236 may separate the output gate terminal 232 from a restricting region 238 (identified in FIGS. 4 and 5) of the fluid channel within the flexible bubble 236 and an output gate exhaust chamber 240 (identified in FIGS. 4 and 5) between an exterior of the flexible bubble 236 and the flexible membrane 234. The plunger 216 may be positioned within the output gate exhaust chamber 240. In some embodiments, at least one exhaust outlet 224 may be in fluid communication with the output gate exhaust chamber 240, enabling the output gate exhaust chamber 240 to freely (i.e., without resistance from fluid pressure within the output gate exhaust chamber 240) expand and contract upon pressurization and depressurization of the input gate terminal 230.

The valve body 222 may include a drive body portion 244 at least partially defining the input gate terminal 230, a gate body portion 246 at least partially defining the plunger 216 and/or the output gate terminal 232, and a fluid channel body portion 248 at least partially defining the inlet port 212 and the outlet port 214. The drive body portion 244 and the gate body portion 246 may be separated from each other and coupled to (e.g., adhered to, chemically bonded to) each other by the flexible membrane 234. The gate body portion 246 and the fluid channel body portion 248 may be separated from each other and coupled to (e.g., adhered to, chemically bonded to) each other by a flexible material 250 forming the flexible bubble 236.

Figures 3A, 3B:
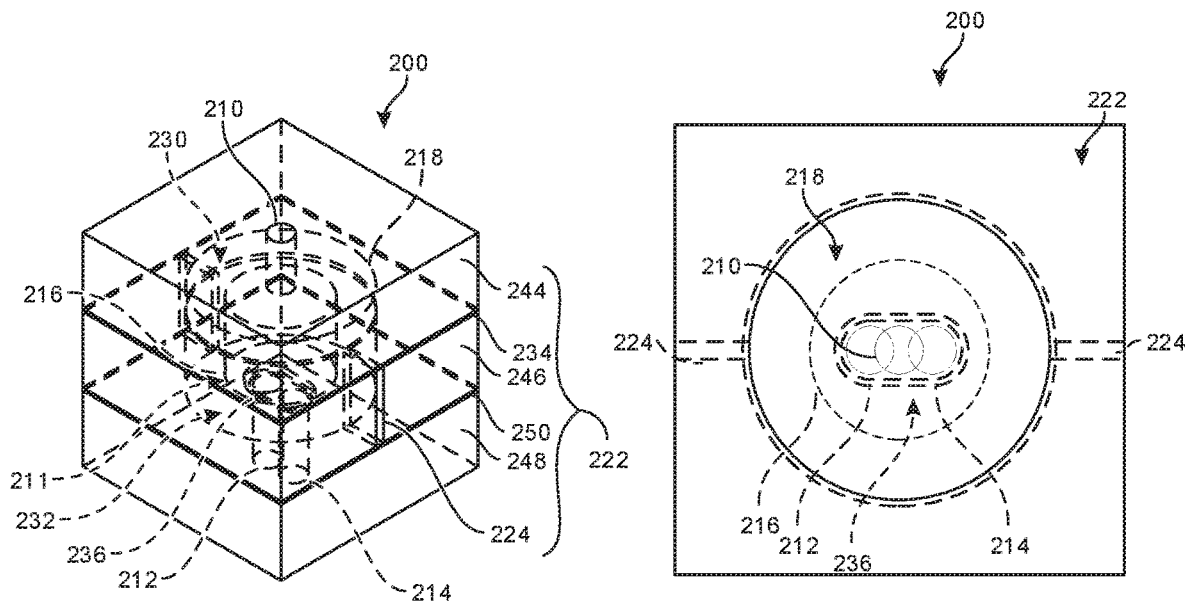
FIG. 3A is transparent perspective view of a microfluidic valve, according to at least one embodiment of the present disclosure.
FIG. 3B is a partially transparent top view of the microfluidic valve of FIG. 3A, according to at least one embodiment of the present disclosure.
Figure 4:
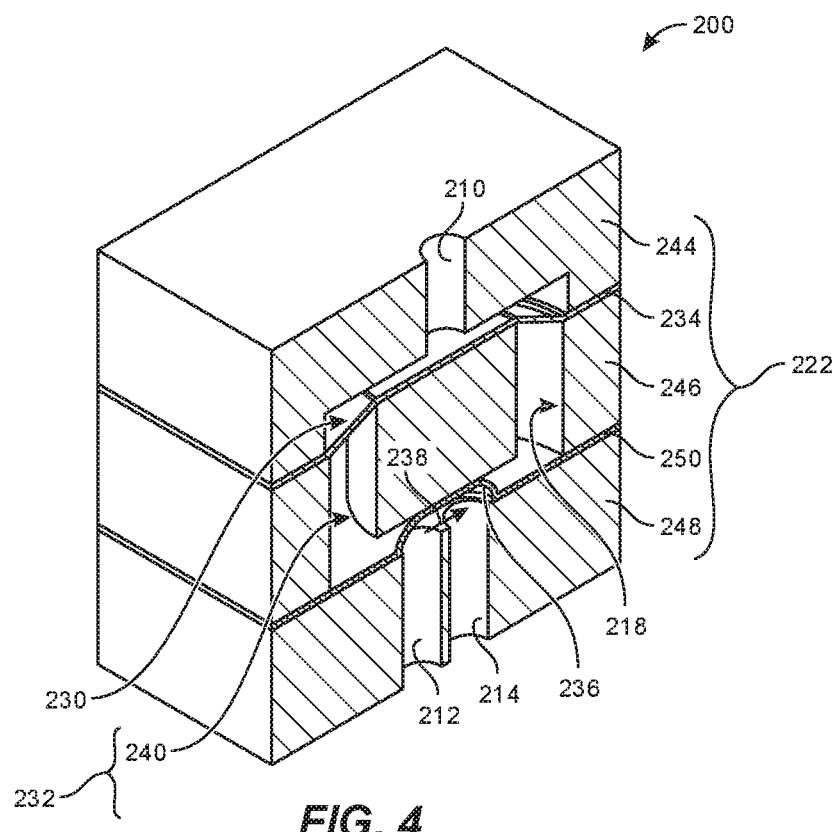
FIG. 4 is a cross-sectional perspective view of the microfluidic valve of FIG. 3A, according to at least one embodiment of the present disclosure.
Figure 5:
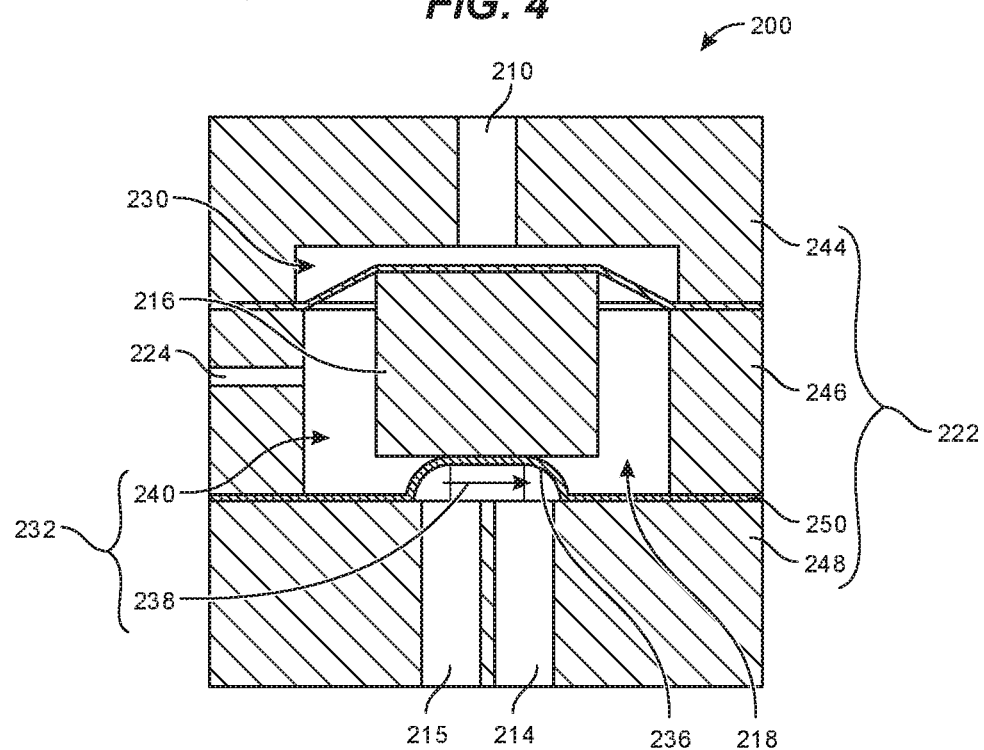
FIG. 5 is a cross-sectional side view of the microfluidic valve of FIG. 3A, according to at least one embodiment of the present disclosure

Sufficient pressurization and depressurization of the input gate terminal 230 by introducing or withdrawing a drive fluid through the gate port 210 may move the plunger 216 and the flexible membrane 234 respectively down and up (from the perspective of FIGS. 3A, 4, and 5). Thus, when the input gate terminal 230 is sufficiently pressurized, the plunger 216 may be moved downward to restrict (e.g., shrink, block) the restricting region 238 between the inlet port 212 and the outlet port 214. In some embodiments, the downward movement of the plunger 216 may press against and deform (e.g., depress) the flexible bubble 236 to contract the restricting region 238. Blocking the restricting region 238 may inhibit (e.g., reduce or terminate) subject fluid flow from the inlet port 212 to the outlet port 214, thus closing the microfluidic valve 200.

Upon sufficient depressurization of the input gate terminal 230, the plunger 216 may be moved upward to unblock the restricting region 238. For example, the upward movement of the plunger 216 may relieve pressure on the flexible bubble 236 to allow the restricting region 238 to expand. Expansion of the restricting region 238 may be accomplished by one or both of elastic properties of the flexible bubble 236 and/or the pressurization of the inlet port 212. Unblocking the restricting region 238 may allow the subject fluid to flow from the inlet port 212 to the outlet port 214, thus opening the microfluidic valve 200.

In some examples, the exhaust outlet 224 may be used to pressurize and/or depressurize the output gate exhaust chamber 240, such as to facilitate blocking or unblocking of the restricting region 238. By way of non-limiting example, a surface area of the flexible membrane 234 within the cavity 218 may be larger than a surface area of the flexible bubble 236. When the input gate terminal 230 is pressurized, a force applied by the plunger 216 against the flexible bubble 236 may be proportional to a ratio of the surface area of the flexible membrane 234 to the surface area of the flexible bubble 236. Therefore, the larger surface area of the flexible membrane 234 compared to the surface area of the flexible bubble 236 may provide a mechanical advantage to close the microfluidic valve 200 with a lower pressure of drive fluid in the input gate terminal 230 than if the surface areas were equal. In some examples, a cross-sectional area of the cavity 218 taken parallel to the flexible membrane (i.e., a surface area of the flexible membrane 234 within the cavity 218) may be about 25 mm2 or less, such as about 1 mm2 or less.

As shown in FIGS. 3A-5, the plunger 216 and the cavity 218 may each have a cylindrical shape with a circular cross-section. However, the present disclosure is not so limited. For example, in additional embodiments, one or both of the plunger 216 and/or the cavity 218 may have a cross-sectional shape that is square, rectangular, oval, elliptical, or irregular. The shape and size of the plunger 216, cavity 218, gate port 210, inlet port 212, and outlet port 214 may be selected to adjust the mechanical, fluidic, and functional properties of the microfluidic valve 200.

Figure 6:
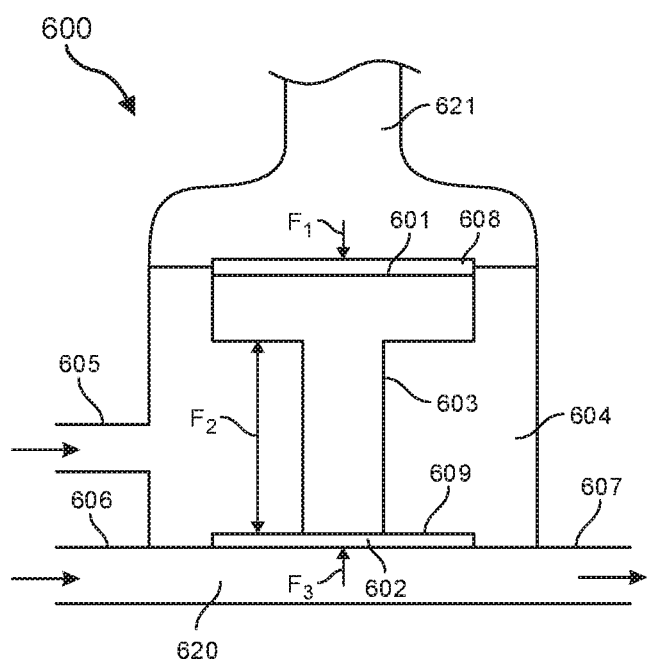
FIG. 6 is an illustration of an embodiment of an apparatus configured to use force or displacement to adjust fluid flow in a fluidic control valve.

FIG. 6 illustrates an embodiment of a normally open microfluidic control valve 600. This microfluidic control valve 600 may include an inlet 606 and an outlet 607. The microfluidic control valve 600 may also include an exhaust outlet 605 that may also act as an inlet. Indeed, any of the inlets or outlets described herein may be configured to be inlets or outlets, depending on the configuration of the microfluidic control valve. In one form of operation, a gate transmission element 603 may be pressed toward the channel 620 (similar to the functionality described with reference to FIG. 1). The gate transmission element 603 may have multiple gate terminals including 601 at the top and 602 at the bottom (or even a third gate terminal positioned in a restriction region in the channel 620). The gate terminals are locations on the gate transmission element where force or pressure is applied. In some cases, separation elements (e.g., 608 or 609) may be placed between the gate terminals and the various fluidic channels. These separation elements may be made of flexible materials, as noted above, and may be moved (e.g., by the gate transmission element) to cover fluid inlets or outlets.

When a pressure or force is applied (e.g., F1), that pressure or force may cause the gate transmission element 603 to be pressed downward into the channel 620, blocking flow from the inlet 606 to the outlet 607. During this process, pressure within the interstitial region 604 next to the gate transmission element 603 may change. In some cases, excess pressure may be evacuated through the exhaust outlet 605. However, in at least some of the embodiments herein, a counterpressure or counterforce may be applied at the exhaust outlet 605. This pressure or force applied at the exhaust outlet 605 may cause a change in pressure within the interstitial region 604 and may apply a pressure or force (e.g., F2) to the gate transmission element 603. In the case of a normally open valve that is in a closed position (shown in greater detail below with regard to FIGS. 11A & 11B), the applied pressure at the exhaust outlet 605 may apply a sufficient force (F2) to the gate transmission element 603 to raise the gate transmission element back up to its initial position. That is, the pressure applied at the exhaust outlet 605 may generate a force (F2) that is equivalent to or greater than the downward force (F1) being applied to the gate transmission element 603 at gate terminal 601. In some cases, this pressure applied at the exhaust outlet 605 may be supplemented by back-pressure from the transmission channel 620 (F3) and, in such cases, the gate transmission element 603 may be raised back into an initial position if (F2+F3)<F1.

In one embodiment, an apparatus for controlling movement of a gate transmission element may include a fluidic channel 620 connecting an inlet port 606 and an outlet port 607. The fluidic channel 620 may convey fluid, for example, when a pressure is applied at the inlet port 606. The apparatus 600 may also include a gate transmission element 603 which may be configured to limit fluid flow between the inlet port 606 and the outlet port 607. As noted above, the gate transmission element 603 may be configured to press down upon the channel 620 at a gate terminal 602. The gate terminal may press directly on the channel 620, or may press on a separation element 609 that separates the gate transmission element 603 from the channel 620. The apparatus may further include a gate terminal 601 connected to a fluidic inlet port or other source of pressure or force 621. The pressure or force (e.g., F1) applied at the gate terminal 601 may at least partially control movement of the gate transmission element 603. In the embodiment of FIG. 6, the force F1 may press the gate transmission element 603 downward. The apparatus may further include a gate terminal 602 connected to the force or pressure source 621. Pressure or force at the gate terminal 602 may at least partially control movement of the gate transmission element 603.

In some embodiments, a pressure or force may be applied at the exhaust outlet 605. This may provide a force F2 which may counteract or modulate the force F1 provided by the force or pressure source 621. In such embodiments, the exhaust outlet 605 may act as a third fluidic inlet port, controlling the movement of the gate transmission element 603. As such, a pressure input at an exhaust port may be used to raise or lower the gate transmission element 603. In some cases, a third fluidic inlet port may be used to control a separate gate terminal. Although shown as a solid piece 603 in FIG. 6, the gate transmission element may include multiple different pieces. In such cases, the primary gate terminal (e.g., 601) and the secondary gate terminal (e.g., 602) may not be linked to each other. In such cases, a third inlet (either separate from or the same as exhaust outlet 605) may be used to control the various gate terminals.

Still further, in some embodiments, at least one of the gate terminals may be part of the channel 620. For instance, a back-pressure within channel 620 may push upwards against the gate transmission element 603. As such, at this point (at F3), a back-pressure from the transmission channel may form a gate terminal that presses against the gate transmission element 603 and may prevent the gate transmission element from moving downward. It should be noted that, throughout the figures, substantially any place where a force or pressure is being applied, that force or pressure may be applied via a fluidic connection or via a mechanical connection (e.g., via a spring), via an electromechanical device (e.g., a solenoid), or other means of providing pressure or force.

Figure 7:
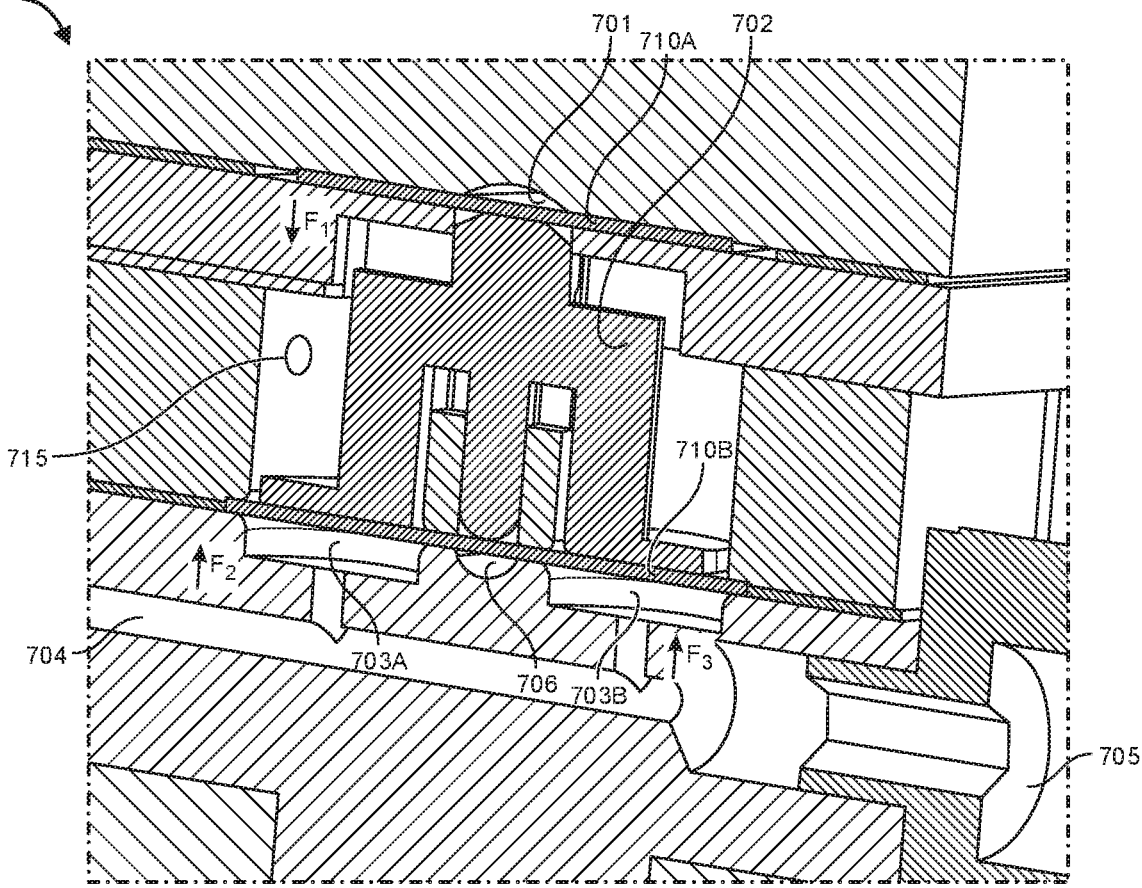
FIG. 7 is an illustration of an alternative embodiment of an apparatus configured to use force or displacement to adjust fluid flow in a fluidic control valve.

FIG. 7 illustrates an embodiment of a normally closed fluidic control valve 700. The normally closed fluidic control valve 700 may include many of the same components of the normally open valve including a gate transmission element 702 with one or more separation elements 710A/710B between a fluidic channel 704 and various gate terminals 703A and 703B. In some embodiments, a spring or other preload may be applied at F1 that causes the gate transmission element 702 to block fluid flow through a channel 706. Pressure may be applied at primary and secondary gate terminal 703A/703B via fluid inlet 705 to raise up the gate transmission element 702 to unblock the fluidic channel 706. Such input pressures F2 and F3 may counteract the preload force F1 enough to raise the gate transmission element 702 into space 701. The separation elements 710A/710B may allow the gate transmission element 702 to move between positions while still providing a seal between various fluidic inlets and/or outlets. The fluidic channel 704 may connect the primary gate terminal 703A and the secondary gate terminal 703B to locations in the fluidic channel of the apparatus. In some embodiments, the valve 700 may include an exhaust outlet 715 that may be the same as or similar to the exhaust outlet 605 of FIG. 6. As with exhaust outlet 605, the exhaust outlet 715 may allow the valve 700 to be controlled using a counter-pressure applied at the exhaust outlet 715.

Figure 8:
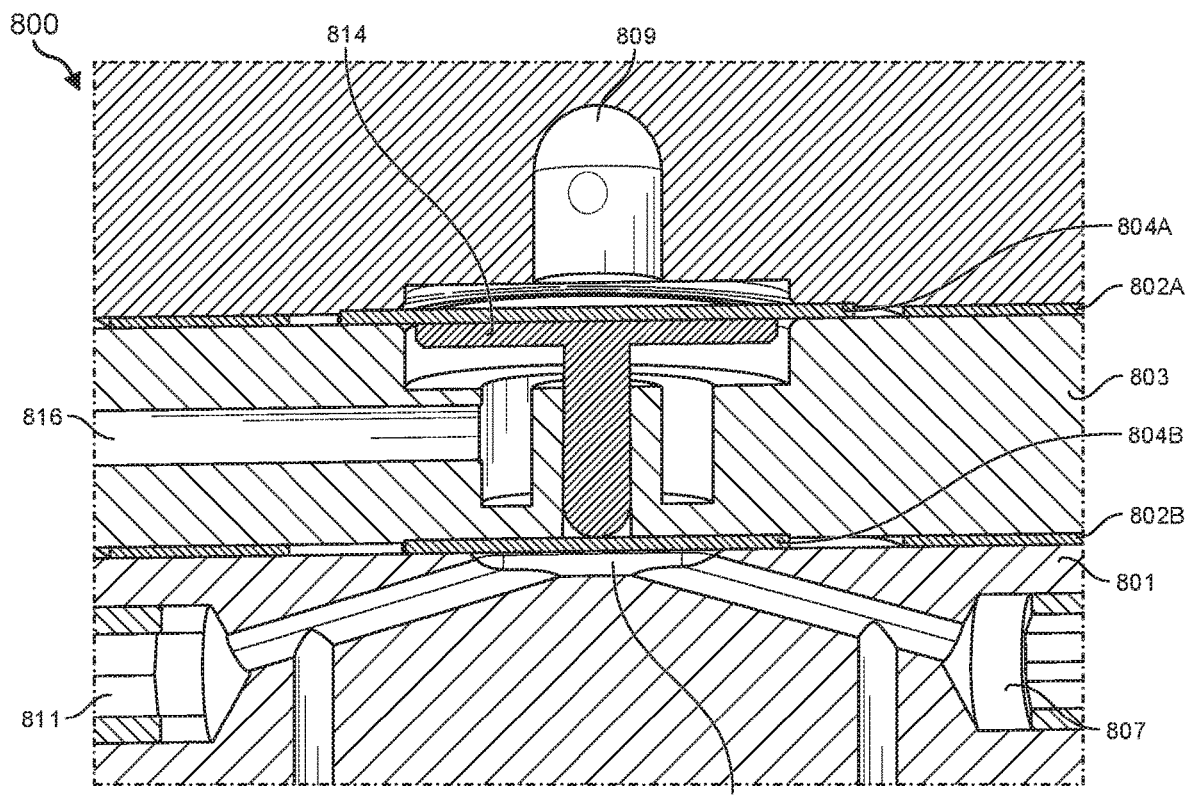
FIG. 8 is an illustration of an alternative embodiment of an apparatus configured to use force or displacement to adjust fluid flow in a fluidic control valve.

In some embodiments, as shown in FIG. 8, a microfluidic control valve 800 may include multiple layers and/or multiple separation elements. For instance, a separation element (e.g., membrane 804B) may be placed over a juncture 813 between source channel 811 and drain channel 807 (although it should be noted that, in some cases, 811 may be a drain channel and 807 may be a source channel, depending on configuration). Optional shim layers 802A/802B may prevent the membranes 804A/804B from being overly compressed. The membrane 804A may be positioned over the transmission element 814. In this manner, fluid may flow between a source 811 and a drain 807 when the membranes are not being stretched by the transmission element 814, and fluid may stop flowing when the transmission element pushes the membrane 804B against the open channel from source to drain (i.e., in juncture 813).

The microfluidic control valve 800 may also include an exhaust channel 816 in at least one of the layers including the transmission housing layer 803, or the channeled layer 801. The exhaust channel 816 may be configured to exhaust pressure from the interstitial region or "exhaust region" of the microfluidic control valve 800. In some cases, the pressure may be exhausted to the atmosphere. In other case, the pressure may be exhausted to a pressurized exhaust area. As noted above, this pressurized exhaust area may be used to control or modulate movement of the gate transmission element 814. A specified amount of back-pressure applied at the exhaust channel 816 may, for example, raise the gate transmission element 814 or at least prevent it from moving lower. A pressurized exhaust area may prevent the gate transmission element 814 from moving down into the juncture 813, for example, and, in the case of a normally closed valve (e.g., valve 900 of FIG. 9), may cause the normally closed gate transmission element 914 to raise up and allow fluid flow between inlet and outlet.

Figure 9:
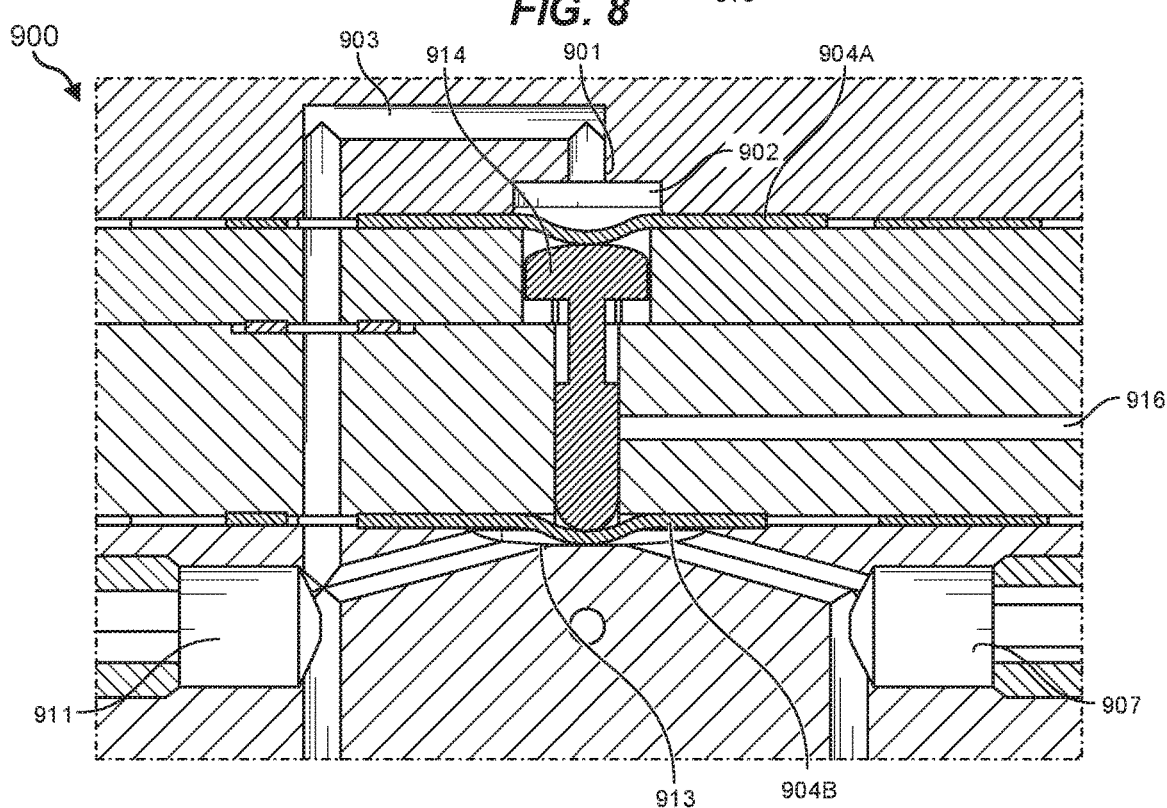
FIG. 9 is an illustration of an alternative embodiment of an apparatus configured to use force or displacement to adjust fluid flow in a fluidic control valve.

For example, as shown in FIG. 9, microfluidic control valve 900 may be a normally closed valve. Accordingly, during normal operation, the microfluidic control valve 900 may be in a closed position that prevents fluid from flowing from the source 911 to the drain 907. The transmission element 914 is shown in an extended position, pushing down on the membrane 904B. In this position, the membrane 904B may prevent fluid from flowing from the source 911 to the drain 907. In some cases, the transmission element 914 may be preloaded into this closed position via a preloaded input pressure at the gate, or via a spring, lever or other mechanical or electro-mechanical preloading mechanism. At least in some cases, the gate 901 may be implemented as a pressure line that actuates the valve. As such, the preload pressure may be an extra line 903 that comes from the source pressure (or other constant always-on pressure) to bias the transmission element to close the valve when the gate pressure is low. To overcome this preload force, an input pressure may be applied at gate terminals (e.g., 703A/703B of FIG. 7) or at exhaust port 916. When the terminals or exhaust port receives an input pressure, that input pressure may overcome the preload pressure applied at contact area 902, thus raising the transmission element 914 from a closed position to an open position.

It should be noted that the distance traveled by the transmission element 914 may be relatively small, and that the transmission element may be pressed into a full-stop position or released into a full-open position very quickly. Intermediate positions where fluid flow is limited, but not fully on or off, may also be provided by making small adjustments to the amount of pressure applied by the transmission element. Any pressure holding the transmission element in place over the juncture 913 may be released back through the gate 901 or through another exhaust port, causing the transmission element to return to its initial position. In some embodiments, a separate exhaust port 916 may be implemented to prevent pressure from building up in the interior of the microfluidic control valve 900. As such, port 916 may act as a pressure equalizer, allowing pressure within the interior of the microfluidic control valve to escape to the external environment. The exhaust port 916, like that of normally open valve 800, may be used to control or modulate the movement of gate transmission element 914, moving the gate transmission element up or down by increasing or decreasing pressure applied at the exhaust port 916.

In some embodiments, the microfluidic control valves 600, 700, 800, or 900 may be connected to different pieces of haptic feedback equipment. The haptic feedback equipment may provide tactile feedback to users' hands, feet, arms, legs, head or may be embedded in full body artificial reality suits. These haptic feedback devices (e.g., 1600, 1700, 1800, 1900, 2000, or 2100 of FIGS. 16-21, respectively) may implement microfluidic control valves to control when various actuators in the haptic feedback are active. Additionally or alternatively, the microfluidic control valves may be used to control which type of haptic feedback is provided, or may be used to control the level or intensity of haptic feedback. In some cases, the microfluidic control valves may include one or more electronic controllers that regulate fluid flow through the source-to-drain channel according to input signals received at the electronic controller. For instance, a microfluidic control valve may include an electronic controller that may receive input signals from a user or other entity. The input signals may indicate how the microfluidic control valve is to operate, including how much to open or close the valve and when to open or close the valve.

FIG. 10 illustrates an embodiment in which one microfluidic control valve (e.g., 600A) may be connected to another microfluidic control valve (e.g., 600B). The microfluidic control valves 600A/600B may be the same as or different than the microfluidic control valve 600 of FIG. 6. Furthermore, while two microfluidic control valves are shown as being connected to each other, it will be recognized that substantially any number of valves may be connected to each other. Moreover, it will be recognized that the microfluidic control valves may be connected via any number of different fluidic ports. In FIG. 10, the microfluidic control valves 600A/600B are depicted as being connected via an exhaust port 605A/605B. the microfluidic control valves 600A/600B may also be connected via fluidic inlets 606A/606B and fluidic outlets 607A/607B.

In some cases, the pressure at an exhaust port may be used to control the input pressure at another port. For example, an exhaust pressure at exhaust port 605B may be used as an input pressure at exhaust port 605A of valve 600A. The amount of exhaust pressure outputted by exhaust port 605B may be controlled to supply a precise amount of input pressure at the exhaust port 605A of valve 600A. As can be seen in FIG. 10, the fluidic channel 620 may connect to multiple gate terminals including 602A of valve 600A and gate terminal 602B of valve 600B, and the fluidic channel 625 may connect gate terminals 601A and 601B. Thus, various fluidic channels including 620 and 625 may be used to connect gate terminals of different microfluidic control valves. Pressure or force inputs at different input or output ports may control pressures and forces (e.g., P1, P2, P3) at different gate terminals. In this manner, multiple microfluidic valves may be controlled together as a unit. Alternatively, inputs at a single valve may be used to control pressures or forces on other valves. Thus, a pressure or force at a primary or secondary gate terminal (e.g., 601B or 602B) may at least partially control movement of a gate transmission element of another apparatus (e.g., gate transmission element 603A of valve 600A).

In some embodiments, a pressure or force at one of the gate terminals in a given microfluidic control valve may at least partially cause movement of the gate transmission element in a substantially opposite direction from another gate terminal. As shown in FIG. 6 and in FIG. 10, a force or pressure P1 applied at one gate terminal 601A may cause movement in an opposite direction from pressures P2 or P3 which may press upward on the gate transmission element 603A. The pressures P1, P2, and P3 may each at least partially modulate the force at which the gate transmission element 603A presses on a separation element (e.g., 608 or 609 of FIG. 6). The separation element may, in turn, press onto a fluidic channel, constricting flow of fluid through a constricting region.

Although FIG. 10 is depicted as linking two normally open valves, it will be understood that substantially any type of microfluidic valves may be linked together, including normally open valves, normally closed valves, complementary valves, or any other type of valve. Moreover, substantially any type and any number of microfluidic valves may be linked together. These linkages may include fluidic channel linkages, exhaust port linkages (as shown in FIG. 10), and other types of linkages. Thus, pressure or force inputs applied at an exhaust port may be used to control one or a plurality of different microfluidic control valves. In some cases, the exhaust output at one microfluidic control valve may be used as feedback for providing other input pressures such as P1 or P3.

Figure 11A:
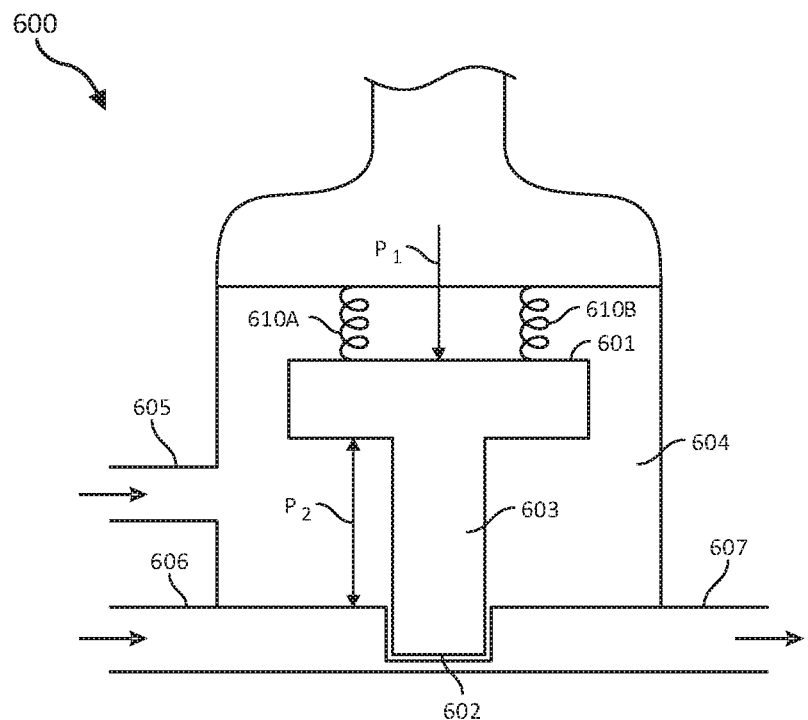
FIGS. 11A and 11B are illustrations of embodiments where preload forces are applied to a gate terminal element.
Figure 11B:
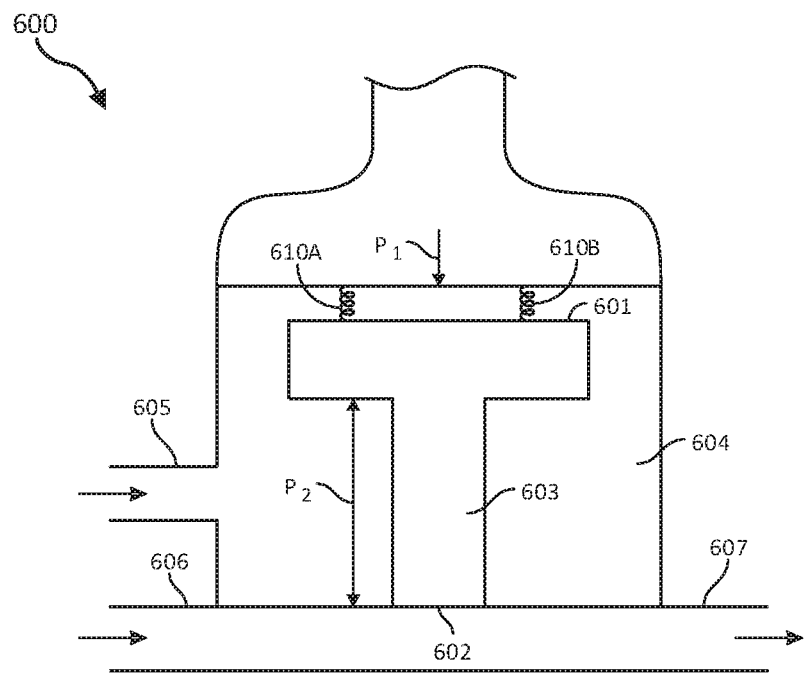

FIG. 11A illustrates an embodiment of a normally open microfluidic control valve 600 in which a preload force is applied to the gate transmission element 603. This preload may cause the gate transmission element 603 to move sufficiently to limit fluid from flowing from the inlet port 606 to the outlet port 607. The preload force or pressure P1 may be applied by springs 610A/610B, or may be applied by a fluidic pressure, or may be applied by some other mechanical, electro-mechanical, or fluidic means. In some cases, the preload force or pressure P1 may be applied to the gate transmission element 603 at a primary gate terminal (e.g., 601). An input pressure (e.g., P2) may be applied at the secondary gate terminal 602 to counteract the preload force or pressure P1 on the gate transmission element 603. As such, the input pressure at the secondary gate terminal 602 may move the gate transmission element 603 such that fluid flow increases from the inlet port to the outlet port. Accordingly, as shown in FIG. 11B, an input pressure at the exhaust port 605 may increase the overall pressure within the interstitial region 604 and may cause a pressure P2 to be applied to the gate transmission element 603, lifting it up to allow fluid to flow from the inlet 606 to the outlet 607.

In some embodiments, an upward threshold may be established for modulating the force or pressure P2 needed to push the gate transmission element 603 upward from a closed position. The upward threshold may be established using springs or fluidic pressures of a certain magnitude at P1. The springs 610A/610B may be uncoiled and may push down on the gate transmission element 603. These uncoiled springs may counteract any pressure P2 pushing upward on the gate transmission element by a certain amount of counterforce. This amount of counterforce may be selected by choosing springs of a certain strength. Similarly, a downward threshold for modulating the force or pressure needed to push the gate transmission element 603 downward to block fluid flow may also be controlled using springs or pressure preloads. For example, if springs 610A/610B are coiled springs that resist being drawn downward, the coiled springs may provide a preloaded upward force that may be overcome by pressures or forces pushing down on the gate transmission element 603 (e.g., pressure P1). Thus, specific springs or input preloads may set minimum thresholds which need to be overcome before the gate transmission element 603 will move upward or downward.

Figure 12A:
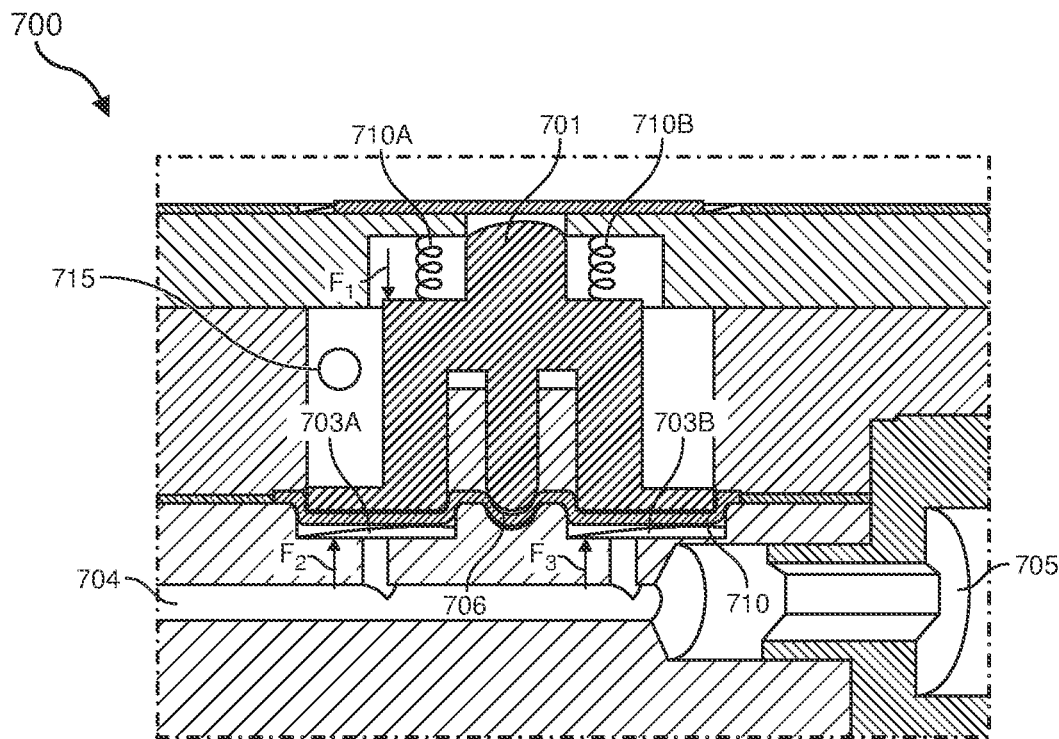
FIGS. 12A and 12B are illustrations of alternative embodiments where preload forces are applied to a gate terminal element.
Figure 12B:
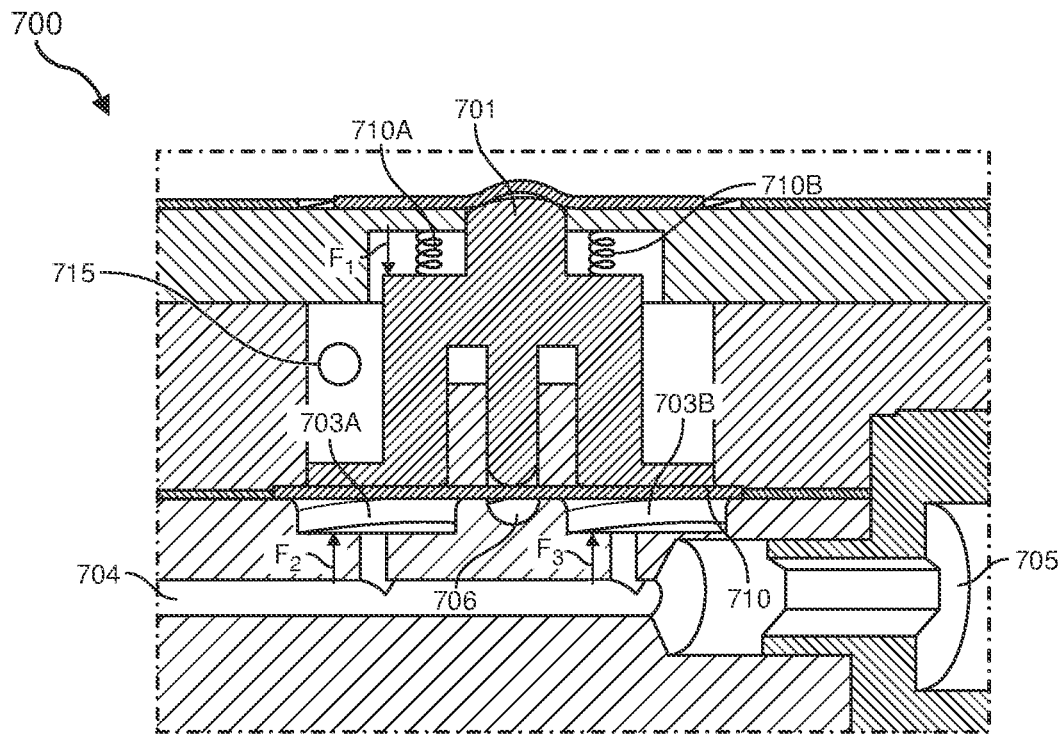

Similar springs or preloads may be applied in the normally closed microfluidic control valve 700 of FIG. 7. In FIG. 12A, the microfluidic control valve 700 may include two springs 710A/710B. These springs, as with springs 610A/610B of FIGS. 11A & 11B, may be in a tightly coiled form that resists being drawn downward. When in the closed position, as in FIG. 12A, the springs 710A/710B may provide a preload force F1 downward on the gate transmission element 701. Counteracting pressures or forces F2/F3 applied against separation element 710 at gate terminals 703A and 703B and/or at exhaust outlet 715 may overcome this preload force and push the gate transmission element 701 upward, thereby opening the valve and allowing fluid to flow through channel 706, as shown in FIG. 12B.

Figure 12C:
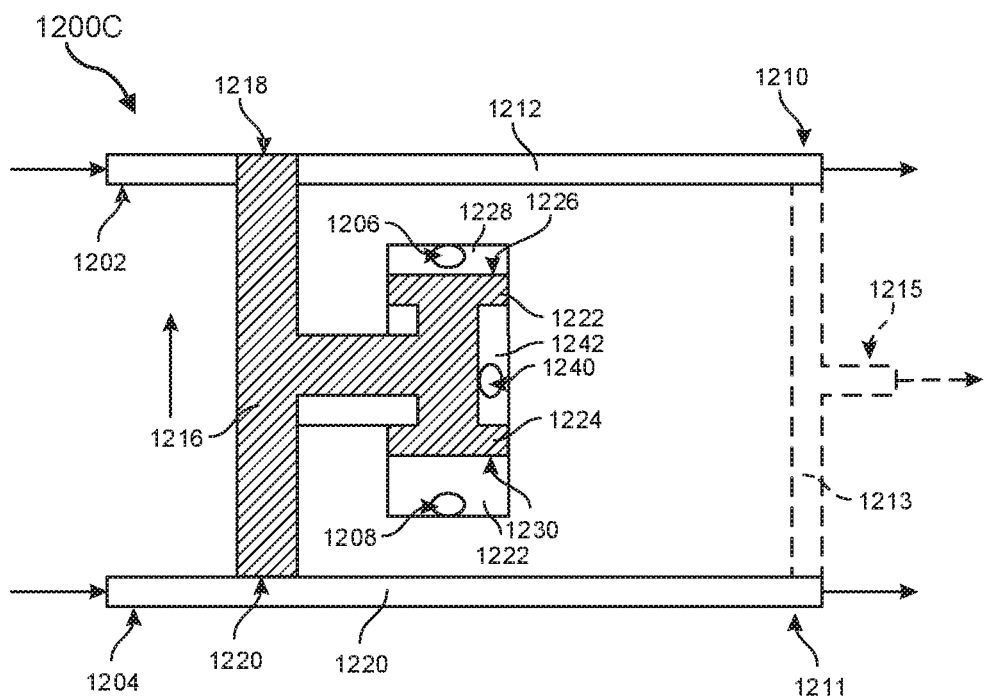
FIGS. 12C and 12D are illustrations of alternative embodiments of an apparatus configured to use force or displacement to adjust fluid flow in a fluidic control valve.
Figure 12D:
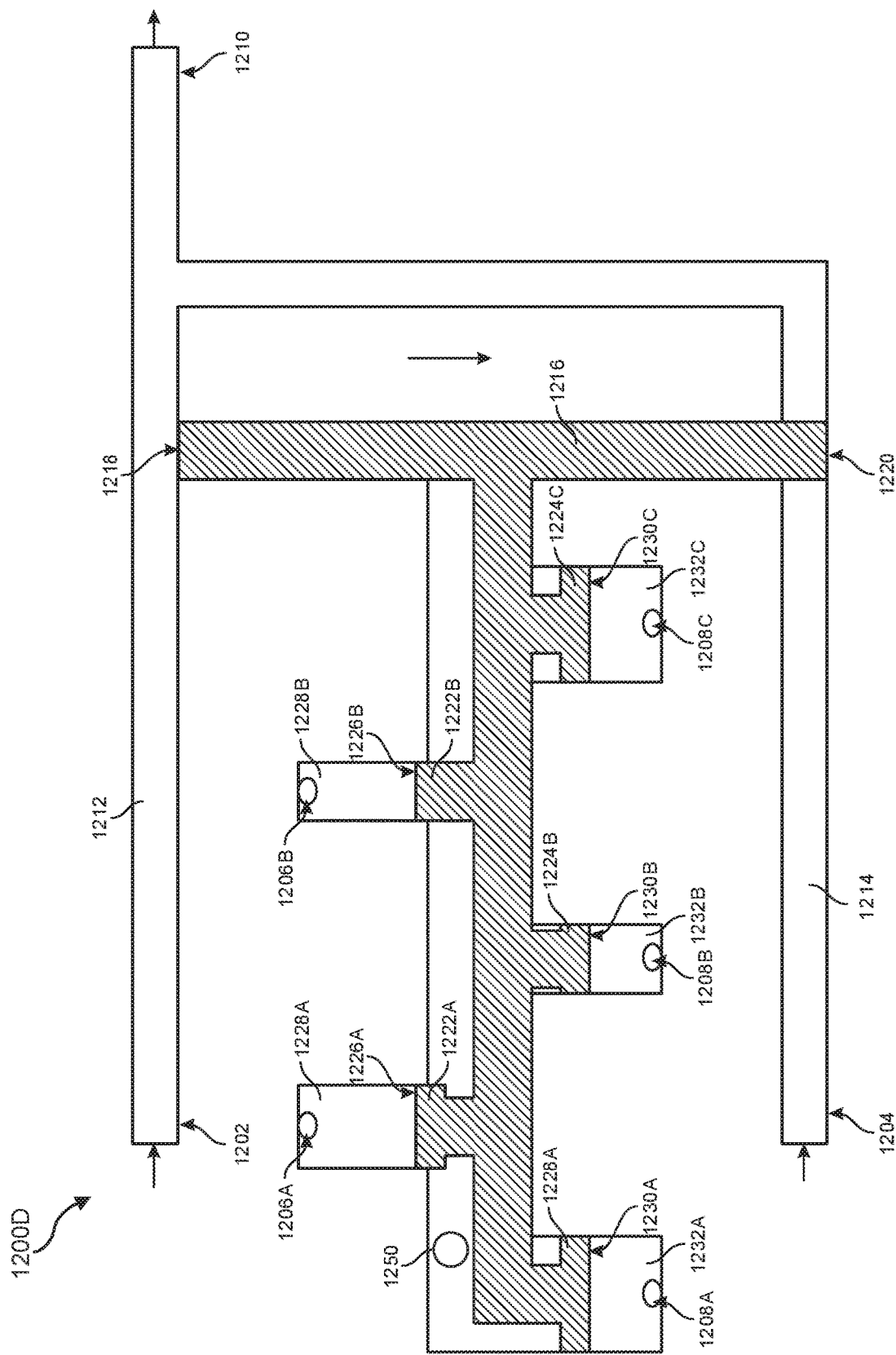

FIGS. 12C and 12D illustrate examples of complementary fluidic valves 1200C and 1200D. The complementary fluidic valve 1200C of FIG. 12C may include an inlet port 1202, an inlet port 1204, a control port 1206, a control port 1208, an outlet port 1210, an outlet port 1211, a fluid channel 1212 configured to convey fluid from inlet port 1202 to outlet port 1210, a fluid channel 1214 configured to convey fluid from inlet port 1204 to outlet port 1211, and a piston 1216. In at least one example, an internal or external fluid channel 1213 may be configured to convey fluid from fluid channel 1212 or outlet port 1210 to fluid channel 1214 or outlet port 1211. Additionally, fluid channel 1213 may include an additional outlet port 1215.

Piston 1216 may include a restricting gate transmission element 1218 configured to block or restrict fluid channel 1212 when piston 1216 is in the position illustrated in FIG. 12C. Piston 1216 may also include a restricting gate transmission element 1220 configured to block or restrict fluid channel 1214 when piston 1216 is up and unblock fluid channel 1214 when piston 1216 is down (as shown in FIG. 12C. Because of the complementary positions of restricting gate transmission elements 1218 and 1220, fluid flow may not tend to flow directly from inlet port 1202 to inlet port 1204 if/when fluid channel 1213 joins outlet ports 1210 and 1211. Piston 1216 may include complementary or opposing piston heads 1222 and 1224. Piston head 1222 may have a controlling gate transmission element 1226 configured to interface with a control pressure 1228 from control port 1206 that, when applied to controlling gate transmission element 1226 forces piston 1216 downwards. Similarly, piston head 1224 may have a controlling gate transmission element 1230 configured to interface with a control pressure 1232 from control port 1208 that, when applied to controlling gate transmission element 1230 forces piston 1216 upwards (as illustrated in FIG. 12C). In at least one example, control port 1206 or control port 1208 may be permanently closed or absent and control pressure 1228 or control pressure 1232 may be generated by a mechanical preload force.

In some embodiments, fluidic valve 1200 may include an interstitial-pressure outlet/inlet 1240 (e.g., an exhaust outlet) that may direct fluid pressures from/to interstitial region 1242. In some examples, interstitial-pressure outlet/inlet 1240 may connect interstitial region 1242 to an outside atmosphere or an additional control fluid source. In some embodiments, the additional control fluid source may modulate fluid pressures within interstitial region 1242 to actuate piston 1216 or modulate the level of control pressures 1228 and/or 1232 at which piston 1216 actuates.

FIG. 12D illustrates an alternative embodiment of a complementary valve 1200D. In some examples, the complementary fluidic valve 1200D may include a piston with more than two opposing piston heads. As shown, fluidic valve 1200D may include an inlet port 1202, an inlet port 1204, two upper control ports 1206A-B, three lower control ports 1208A-C, an outlet port 1210, a fluid channel 1212 configured to convey fluid from inlet port 1202 to outlet port 1210, a fluid channel 1214 configured to convey fluid from inlet port 1204 to outlet port 1210, and a piston 1216. The fluidic valve 1200D may also have an exhaust outlet 1250 that allows interstitial pressure to be exhausted to atmosphere. Alternatively, input pressures may be applied to the exhaust outlet 1250 to control movement of the piston 1216. Piston 1216 may include a restricting gate transmission element 1218 configured to block or restrict fluid channel 1212 when piston 1216 is in the up position and unblock fluid channel 1212 when piston 1216 is in the down position (as illustrated in FIG. 12D). Piston 1216 may also include a restricting gate transmission element 1220 configured to block or restrict fluid channel 1214 when piston 1216 is in the up position and unblock fluid channel 1214 when piston 1216 is in the down position.

Piston 1216 may include upper piston heads 1222A-B that complement or oppose lower piston heads 1224A-C. Piston head 1222A may have a controlling gate transmission element 1226A configured to interface with a control pressure 1228A from control port 1206A that, when applied to controlling gate transmission element 1226A forces piston 1216 towards the up position. Similarly, piston head 1222B may have a controlling gate transmission element 1226B configured to interface with a control pressure 1228B from control port 1206B that, when applied to controlling gate transmission element 1226B forces piston 1216 towards the down position illustrated in FIG. 12D. As shown, piston head 1224A may have a controlling gate transmission element 1230A configured to interface with a control pressure 1232A from control port 1208A that, when applied to controlling gate transmission element 1230A forces piston 1216 towards the up position, piston head 1224B may have a controlling gate transmission element 1230B configured to interface with a control pressure 1232B from control port 1208B that, when applied to controlling gate transmission element 1230B forces piston 1216 towards the down position, and piston head 1224C may have a controlling gate transmission element 1230C configured to interface with a control pressure 1232C from control port 1208C that, when applied to controlling gate transmission element 1230C forces piston 1216 towards the up position. Each of controlling gate transmission elements 1226A-B and 1230A-C may have different surface areas. In some examples, the relative surface areas of controlling gate transmission elements 1226A-B and 1230A-C may be configured such that specific pressure differences between the pressures applied to control ports 1206A-B and 1208A-C trigger movement of piston 1216 between the up and down positions.

Figure 13:
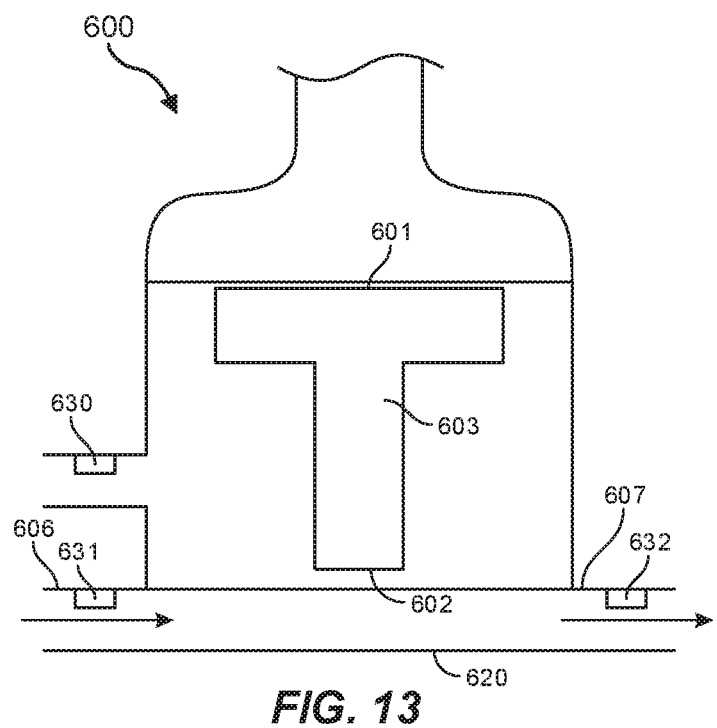
FIG. 13 is an illustration of an embodiment in which pressure sensors are implemented within a fluidic control valve.

In some embodiments, a microfluidic control valve may be equipped with pressure sensors. As shown in FIG. 13, pressure sensors, flow sensors, or other types of sensors may be positioned throughout the microfluidic control valve 600. These sensor inputs may be provided to an electronic controller, a pneumatic controller, or any other type of controller (e.g., controller 1501 of FIG. 15). The controller may receive sensor inputs from various internal pressure sensors (e.g., 630, 631, 632 of FIG. 13) embedded within the channeled layer 601. The internal pressure sensors may be configured to determine internal pressures at different locations within the microfluidic control valve 600. In some cases, the microfluidic control valve 600 may include external pressure sensors configured to determine external pressures at various locations in or around the valve. In some cases, the controller may implement electronic feedback controls that allow the controller to regulate internal pressure at various locations within the microfluidic control valve. Thus, for example, the controller may receive internal pressure measurements and/or external pressure measurements from the internal and external pressure sensors. The controller may use these measurements as feedback to raise or lower the pressure in certain channels within the valve. As such, the controller may control how much pressure is placed on a gate transmission element, for example, at any given time. This will be explained further below with regard to method 1400 of FIG. 14.

Figure 14:
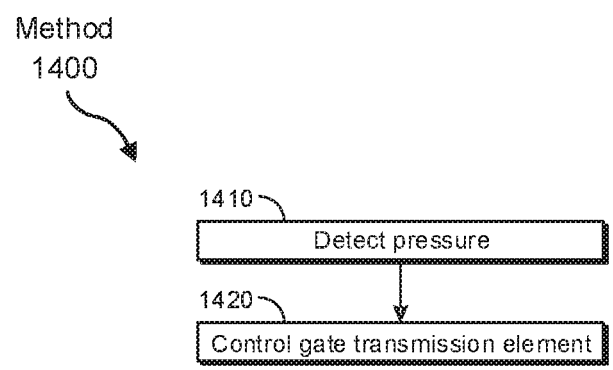
FIG. 14 is a flow diagram of an exemplary method for using force or displacement to adjust fluid flow in a fluidic control valve.

FIG. 14 is a flow diagram of an exemplary computer-implemented method 100 for using force or displacement to adjust fluid flow in a fluidic control valve. The steps shown in FIG. 14 may be performed by any suitable computer-executable code and/or computing system. In one example, each of the steps shown in FIG. 14 may represent an algorithm whose structure includes and/or is represented by multiple sub-steps, examples of which will be provided in greater detail below.

As illustrated in FIG. 14, at step 1410 one or more of the systems described herein may detecting an amount of pressure or force at a primary gate terminal or at a secondary gate terminal of a fluidic control valve. The fluidic control valve may include a gate transmission element configured to limit fluid flow between an inlet port and an outlet port. For example, a controller 1501 of system 1500 in FIG. 15 may detect an amount of force or pressure at one or more of the pressure detectors 1504, 1505, 1506, or at potentially other pressure detectors. The amount of current pressure may be detected at a primary gate terminal (e.g., using pressure detector 1506), at a secondary gate terminal (e.g., using pressure detector 1504), or at an inlet for the flow path (e.g., using pressure detector 1505). It will be recognized that the placement of the pressure detectors 1504-1506 is arbitrary, and that the pressure detectors may be placed in different positions depending on implementation and depending on where it is desirable to have a pressure reading.

At step 1420 of method 1400, the controller 1501 may at least partially control movement of the gate transmission element 603 according to the amount of pressure or force at the primary gate terminal and/or at the secondary gate terminal. In some cases, movement of the gate transmission element 603 may also be caused by or influenced by pressure or force at a tertiary gate terminal or at subsequent gate terminals. The controller 1501 may be linked to one or more valves (e.g., 1502, 1503, etc.) and may be able to open, close, or incrementally adjust those valves to affect the pressure or force applied. For example, the controller 1501 may use valve 1502 to adjust pressure at the exhaust port 605. The controller 1501 may receive feedback data 1507 from pressure detector 1504 (along with pressure readings from other detectors such as 1505 and/or 1506). The controller may use the feedback data 1507 to modulate the valve 1502 to apply more or less pressure at the exhaust port 605. In this manner, the controller 1501 may use sensor feedback data 1507 to apply a sufficient amount of pressure to raise or lower the gate transmission element 603, as described with reference to the preceding figures.

In addition to or as an alternative to pressure detectors, flow sensors, movement sensors, strain sensors, or other types of sensors may be used to provide feedback data 1507. This feedback data 1507 may be used to control pressure and force inputs at various inlets and outlets on the fluidic control device. For instance, an input pressure at inlet port 606, input pressure at the exhaust port 605, input pressure at the outlet 607, or at other locations relative to the gate transmission element 603 may be altered based on detected pressure measurements from the pressure detectors 1504, 1505, and/or 1506.

In the case of fluidic control valve 600, additional force may be applied at gate terminal 601. Applying force or pressure (P1) at gate terminal 601 may increase force on the gate transmission element 603, restricting fluid flow through a restriction region 625. Conversely, applying force or pressure (P2) at gate terminal 602 may reduce force on the gate transmission element 603. This may move the gate transmission 603 away from the restriction region 625, allowing an increased amount of fluid to flow through the restriction region. In some embodiments, the controller 1501 may receive an indication that the gate transmission element 603 is to be moved a specified amount, either upward or downward. In response, the controller 1501 may issue a command or control signal to a valve (e.g., 1502) to increase or decrease pressure or force at one or more of the gate terminals to cause the gate transmission element 603 to move by the specified amount. Thus, the controller 1501 may use back-pressure at the exhaust port 605, for example, to control movement of the gate transmission element 603.

In some cases, the amount of force or pressure applied to the gate transmission element 603 and specifically at the gate transmission element's gate terminals may be supplied by an input pressure or force at one or more of the fluidic control valve's inlets or outlets. The amount of force applied by the gate transmission element to a separation element (e.g., 608 or 609) may be substantially proportional to an amount of input pressure or force applied at each gate terminal separately. Thus, in such cases, a specified amount of input pressure at the exhaust port 605 may place a corresponding amount of pressure on the separation elements 608 or 609. An increased pressure or force applied at gate terminal 601 may increase the amount of force or pressure (P1) on the gate transmission element 603. And, an increased pressure or force applied at another gate terminal (e.g., 602 or another gate terminal) may decrease the force or pressure on the gate transmission element 603.

In some cases, the amount of force applied to the gate transmission element 603 may be substantially proportional to the difference in pressure or force at gate terminal 601 and gate terminal 602, for example. In such cases, the controller 1501 may use this knowledge to apply additional force or pressure at specific gate terminals using specific valves, inlets or outlets. The controller 1501 may be connected to a local or remote data store that may track data for each fluidic control valve, including data indicating that, for a given fluidic control valve, the amount of force applied to the gate transmission element 603 is substantially proportional to the difference in pressure or force at different specified gate terminals. This data, including feedback data 1507, may be stored in the data store.

The feedback data 1507 may be received from one fluidic control valve or from many different fluidic control valves. Indeed, as shown in FIG. 10, in some embodiments, fluidic control valves may be linked to each other. Each of the linked fluidic control valves may have sensors and each sensor may provide feedback data 1507 to a common controller or data store. In this manner, feedback data from other fluidic control valves may be implemented to control movement of the gate transmission element 603. Using this feedback data, the controller 1501 may be used to control valves which supply input pressures at various inlets and outlets, including the exhaust port 605.

In some embodiments, a system may be provided for using force or displacement to adjust fluid flow in a fluidic control valve. Such a system may include a pressure detector (e.g., 1504, 1505, or 1506 of FIG. 15) configured to detect an amount of pressure at a primary gate terminal (e.g., 601) or at a secondary gate terminal (e.g., 602) of the fluidic control valve (e.g., 600). The fluidic control valve may include a gate transmission element (e.g., 603) that may be configured to limit fluid flow between an inlet port (e.g., 606) and an outlet port (e.g., 607) of the fluidic control valve. The system may further include a controller (e.g., 1501) that may be configured to at least partially control movement of the gate transmission element 603 according to the amount of pressure at the primary gate terminal 601 and/or at the secondary gate terminal 602.

In some embodiments, the gate transmission element 603 may be substantially T-shaped, with a proximal end and a distal end, where the distal end has a smaller area of contact than the larger proximal end. The smaller distal end may be configured to press on separation element 609 seated at a juncture 625 between the inlet port 606 and the outlet port 607 of the fluidic control valve 600. The fluidic control valve may include a single separation element (e.g., 609), multiple separation elements (e.g., 608 & 609 or others), or no separation elements. When force or pressure is applied at gate terminal 601, that force or pressure (P1) may be applied to the larger area of contact on the proximal surface of the proximal end of the gate transmission element 603 in conjunction with force applied at gate terminal 602 to the distal surface of the proximal end of the gate transmission element 603. As such, the force or pressure applied to separation element 609, for example, by the distal end of the gate transmission element 603 may be amplified based on the smaller area of contact through which the gate transmission element presses on the separation element.

Figure 15:
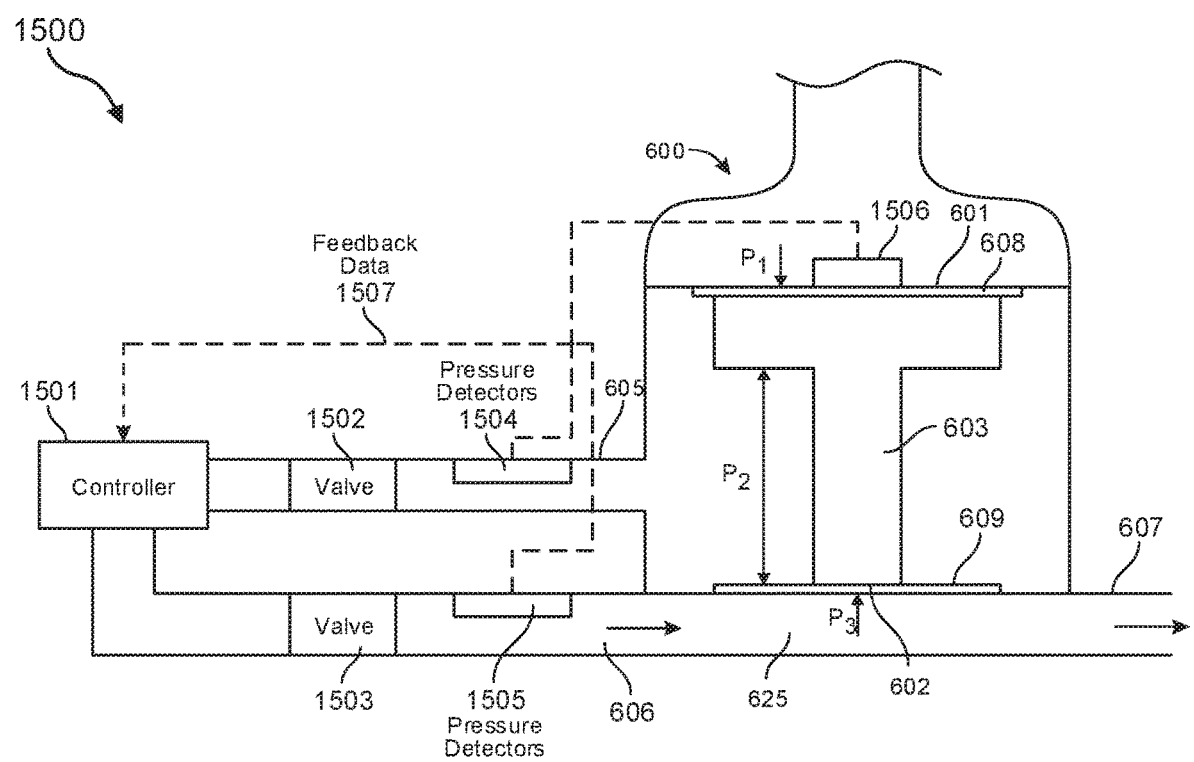
FIG. 15 is an illustration of a controller configured to alter input flows based on feedback from pressure detectors.

It should be noted that, while FIG. 15 illustrates a normally open microfluidic control valve, substantially any type of microfluidic control valve may be used in conjunction with the controller 1501, the valves 1502/1503, the pressure sensors 1504-1506, or other sensors of the system 1500. In one embodiment, for example, the normally closed valve 700 of FIGS. 12A and 12B may be used with the system 1500. In such an embodiment, pressure or forces (e.g., F2, F3) applied at gate terminals 703A and 703B may be at least partially controlled by fluid pressure from a fluidic control valve (e.g., 1502 or 1503) or from other fluidic control valves. The gate terminals 703A/703B and the fluid control valves 1502/1503 from FIG. 15 may be linked together via fluidic channels (e.g., channel 704). Pressure at the gate terminals may at least partially determines the pressure in various locations in the fluidic control valve 700 or in multiple different fluidic control valves (as shown in FIG. 10).

Accordingly, many different types of microfluidic control valves may be provided herein, either alone or in combination with other microfluidic control valve. These microfluidic control valves may be controlled by applying pressures or forces at different points, including applying back pressure at an exhaust port. By controlling the pressure applied at an exhaust port, a controller or other system may regulate or modulate the movement of a gate transmission element within a microfluidic control valve. Moreover, the exhaust port of one microfluidic control valve may be linked to other valves and may be used to control gate transmission elements in those other valves. Feedback and sensor data may further be used to precisely control and fine tune movement of gate transmission elements in a single microfluidic control valve or in an array of different microfluidic control valves.

Example Embodiments

Example 1. An apparatus comprising: a fluidic channel connecting an inlet port and an outlet port; a gate transmission element configured to limit fluid flow between the inlet port and the outlet port; a primary gate terminal connected to a second fluidic inlet port, wherein pressure or force at the primary gate terminal at least partially controls movement of the gate transmission element; and a secondary gate terminal connected to the second fluidic inlet port, wherein pressure or force at the secondary gate terminal at least partially controls movement of the gate transmission element.

Example 2. The apparatus of Example 1, further comprising a separation element between the primary gate terminal and the secondary gate terminal.

Example 3. The apparatus of any of Examples 1 or 2, further comprising a separation element between the fluidic channel and at least one of the primary gate terminal or the secondary gate terminal at least partially isolating fluid in a restriction region of the primary gate terminal or in a restriction region of the secondary gate terminal.

Example 4. The apparatus of any of Examples 1-3, wherein one or more fluidic channels connect at least one of the primary gate terminal and the secondary gate terminal to one or more locations in the fluidic channel of the apparatus.

Example 5. The apparatus of any of Examples 1-4, wherein one or more fluidic channels connect the fluidic channel of the apparatus to a gate terminal of a second, different apparatus.

Example 6. The apparatus of any of Examples 1-5, wherein one or more fluidic channels connect the primary and/or secondary gate terminals of the apparatus to the gate terminal of a second, different apparatus.

Example 7. The apparatus of any of Examples 1-6, wherein one or more fluidic channels connect the fluidic channel of the first apparatus to a fluidic channel of a second, different apparatus.

Example 8. The apparatus of any of Examples 1-7, wherein pressure or force at the primary and/or secondary gate terminals at least partially controls movement of a gate transmission element of the second, different apparatus.

Example 9. The apparatus of any of Examples 1-8, wherein pressure or force at the secondary gate terminal at least partially causes movement of the gate transmission element in a substantially opposite direction from the primary gate terminal.

Example 10. The apparatus of any of Examples 1-9, wherein the apparatus comprises a normally open fluidic control valve, and wherein a pressure or force applied to the gate transmission element is modulated by a pressure or force at the secondary gate terminal, such that the fluidic control valve at least partially limits fluid flow from the inlet port to the outlet port when sufficient pressure or force is applied to the primary gate terminal.

Example 11. The apparatus of any of Examples 1-10, wherein the primary gate terminal and/or the secondary gate terminal at least partially modulates the force at which the gate transmission element presses on a separation element.

Example 12. The apparatus of any of Examples 1-11, wherein a downward threshold for modulating the force and an upward threshold for modulating the force is controlled by increasing a preload pressure or force.

Example 13. The apparatus of any of Examples 1-12, wherein the apparatus comprises a normally closed fluidic control valve in which a preload force is applied to the gate transmission element, causing the gate transmission element to move sufficiently to limit fluid from flowing from the inlet port to the outlet port.

Example 14. The apparatus of any of Examples 1-13, wherein the preload force is applied to the gate transmission element at the primary gate terminal, and wherein the input pressure is applied at the secondary gate terminal to counteract the preload force of the gate transmission element, such that the input pressure at the secondary gate terminal moves the gate transmission element such that fluid flow increases from the inlet port to the outlet port.

Example 15. The apparatus any of Examples 1-14, further comprising one or more pressure sensors configured to detect pressure at one or more locations within the apparatus and/or one or more flow sensors configured to detect fluid flow at one or more locations within the apparatus.

Example 16. The apparatus of any of Examples 1-15, wherein input pressure at at least one of the inlet port, the outlet port, the primary gate terminal or the secondary gate terminal is altered based on detected pressure measurements from one or more of the pressure sensors.

Example 17. The apparatus of any of Examples 1-16, further comprising a tertiary gate terminal, wherein pressure or force applied at the tertiary terminal is substantially in the same direction of the primary terminal or is substantially in the opposite direction of the primary terminal Example 18. A method for using force or displacement to adjust fluid flow in a fluidic control valve, comprising: detecting an amount of pressure or force at a primary gate terminal or at a secondary gate terminal of the fluidic control valve, the fluidic control valve including a gate transmission element configured to limit fluid flow between an inlet port and an outlet port of the fluidic control valve; and at least partially controlling movement of the gate transmission element according to the amount of pressure or force at the primary gate terminal and/or at the secondary gate terminal.

Example 19. The method of Example 18, wherein applying pressure or force at the primary gate terminal increases force on the gate transmission element, restricting fluid flow through a restriction region, and wherein applying pressure or force at the secondary gate terminal reduces force on the gate transmission element, allowing an increased amount of fluid to flow through the restriction region.

Example 20. The method of any of Examples 18-19, further comprising: receiving an indication that the gate transmission element is to be moved a specified amount; and increasing or decreasing pressure or force at at least one of the primary gate terminal or the secondary gate terminal to cause the gate transmission element to move by the specified amount.

Example 21. The method of any of Examples 18-20, wherein an amount of force applied to the gate transmission element at at least one of the primary gate terminal and the secondary gate terminal is supplied by an input pressure or force.

Example 22. The method of any of Examples 18-21, wherein an amount of force applied to the gate transmission element to a separation element is substantially proportional to an amount of input pressure or force applied at each gate terminal separately.

Example 23. The method of any of Examples 18-22, wherein increased pressure or force applied at the primary gate terminal increases force on the gate transmission element, and wherein increased pressure or force applied at the secondary gate terminal decreases force on the gate transmission element.

Example 24. The method of any of Examples 18-23, wherein an amount of force applied to the gate transmission element is substantially proportional to the difference in pressure or force at the primary gate terminal and the secondary gate terminal.

Example 25. The method of any of Examples 18-24, wherein feedback from a second fluidic control valve is implemented to at least partially control the gate transmission element.

Example 26. The method of any of Examples 18-25, wherein at least one of the inlet port or the outlet port is implemented to at least partially control gate pressures or forces in the fluidic control valve.

Example 27. A system for using force or displacement to adjust fluid flow in a fluidic control valve, comprising: a pressure detector configured to detect an amount of pressure at a primary gate terminal or at a secondary gate terminal of the fluidic control valve, the fluidic control valve including a gate transmission element configured to limit fluid flow between an inlet port and an outlet port of the fluidic control valve; and a controller configured to at least partially control movement of the gate transmission element according to the amount of pressure at the primary gate terminal and/or at the secondary gate terminal.

Example 28. The system of Example 27, wherein the gate transmission element comprises a proximal end and a distal end, the distal end having a smaller area of contact than the larger proximal end, the smaller distal end being configured to press on a separation element seated at a juncture between the inlet port and the outlet port of the fluidic control valve.

Example 29. The system of any of Examples 27-28, wherein the fluidic control valve further comprises a separation element between the primary gate terminal and the secondary gate terminal.

Example 30. The system of any of Examples 27-29, wherein force applied at the primary gate terminal is applied to the larger area of contact on a proximal surface of the proximal end of the gate transmission element in conjunction with force applied at the secondary gate terminal to the distal surface of the proximal end of the gate transmission element, such that the force applied to the separation element by the distal end of the gate transmission element is amplified based on the smaller area of contact through which the gate transmission element presses on the separation element.

Example 31. The system of any of Examples 27-30, wherein pressure at the primary gate terminal and/or the secondary gate terminal is at least partially controlled by fluid pressure from the fluidic control valve or from one or more other fluidic control valves, and wherein the primary and/or secondary gate terminals and the fluid control valves are linked together via fluidic channels.

Example 32. The system of any of Examples 27-31, wherein pressure at the primary gate terminal and/or the secondary gate terminal at least partially determines the pressure in one or more locations in the fluidic control valve or in a plurality of different fluidic control valves, and wherein the primary and/or secondary gate terminals and the fluidic control valves are linked together via fluidic channels.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 1600 in FIG. 16. Other artificial reality systems may include a NED that also provides visibility into the real world (e.g., augmented-reality system 1700 in FIG. 17) or that visually immerses a user in an artificial reality (e.g., virtual-reality system 1800 in FIG. 18). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 16:
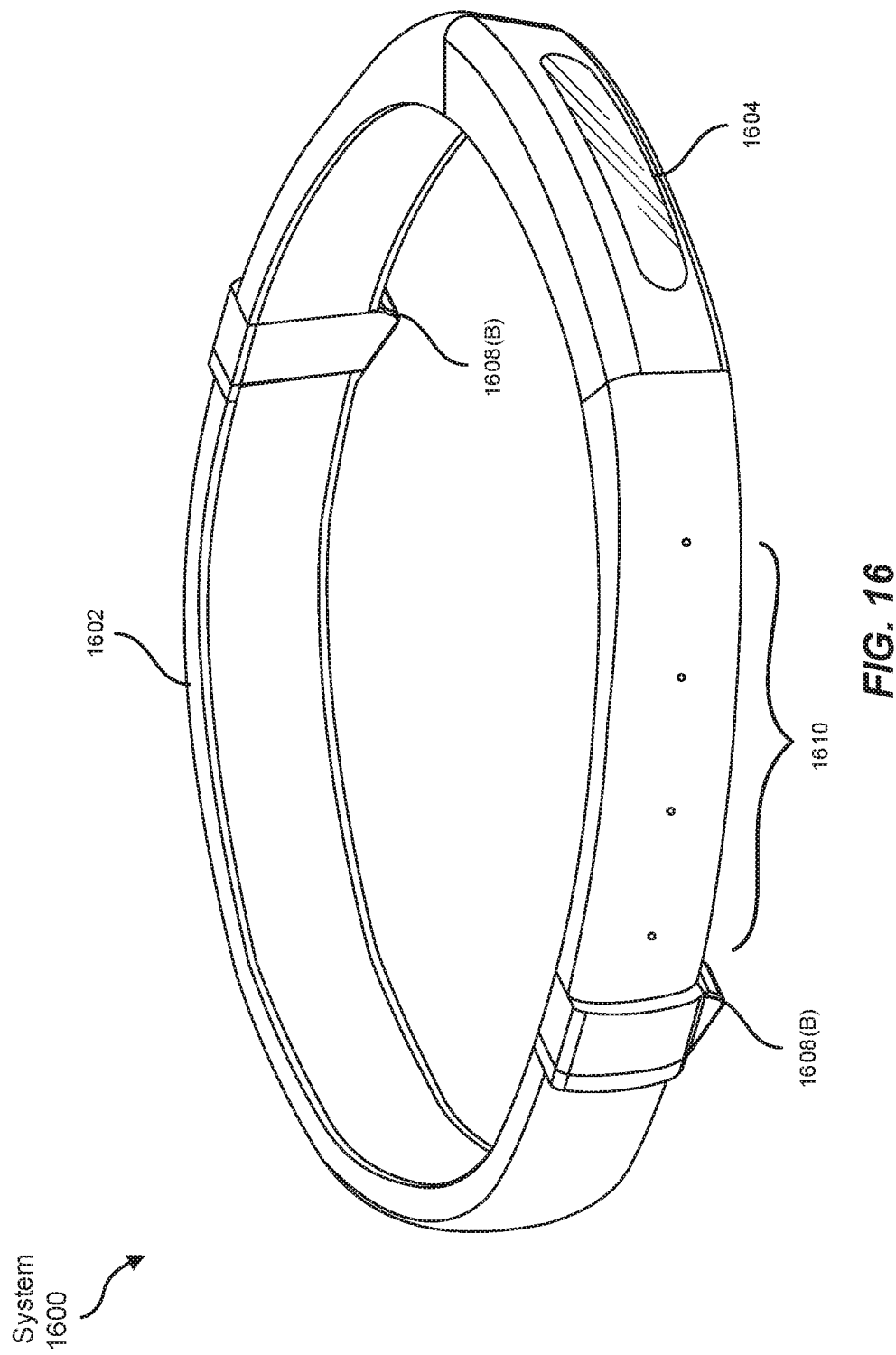
FIG. 16 is an illustration of an example artificial-reality headband that may be used in connection with embodiments of this disclosure.

Turning to FIG. 16, augmented-reality system 1600 generally represents a wearable device dimensioned to fit about a body part (e.g., a head) of a user. As shown in FIG. 16, system 1600 may include a frame 1602 and a camera assembly 1604 that is coupled to frame 1602 and configured to gather information about a local environment by observing the local environment. Augmented-reality system 1600 may also include one or more audio devices, such as output audio transducers 1608(A) and 1608(B) and input audio transducers 1610. Output audio transducers 1608(A) and 1608(B) may provide audio feedback and/or content to a user, and input audio transducers 1610 may capture audio in a user's environment.

As shown, augmented-reality system 1600 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1600 may not include a NED, augmented-reality system 1600 may include other types of screens or visual feedback devices (e.g., a display screen integrated into a side of frame 1602).

Figure 17:
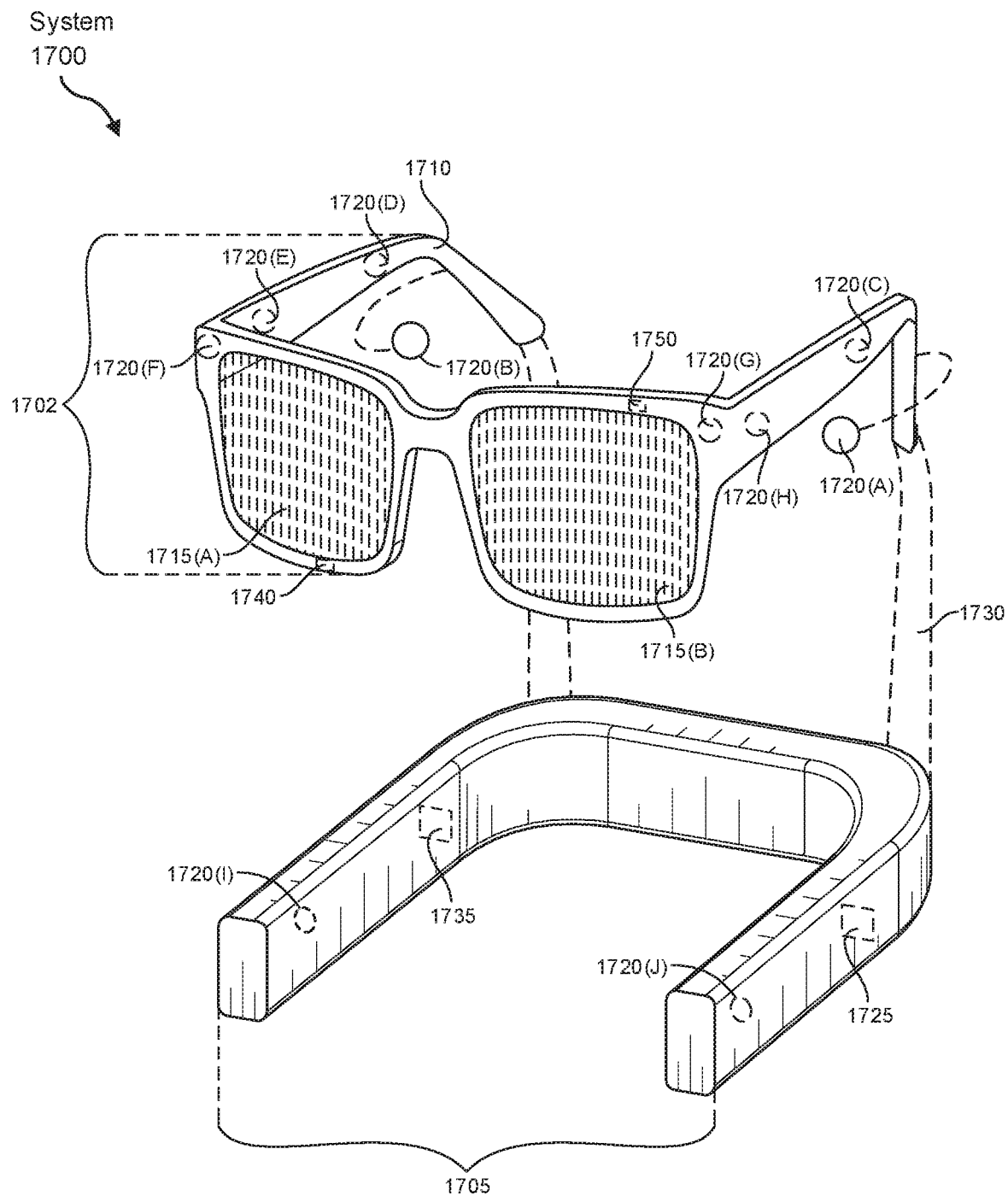
FIG. 17 is an illustration of example augmented-reality glasses that may be used in connection with embodiments of this disclosure.

The embodiments discussed in this disclosure may also be implemented in augmented-reality systems that include one or more NEDs. For example, as shown in FIG. 17, augmented-reality system 1700 may include an eyewear device 1702 with a frame 1710 configured to hold a left display device 1715(A) and a right display device 1715(B) in front of a user's eyes. Display devices 1715(A) and 1715(B) may act together or independently to present an image or series of images to a user. While augmented-reality system 1700 includes two displays, embodiments of this disclosure may be implemented in augmented-reality systems with a single NED or more than two NEDs.

In some embodiments, augmented-reality system 1700 may include one or more sensors, such as sensor 1740. Sensor 1740 may generate measurement signals in response to motion of augmented-reality system 1700 and may be located on substantially any portion of frame 1710. Sensor 1740 may represent a position sensor, an inertial measurement unit (IMU), a depth camera assembly, or any combination thereof. In some embodiments, augmented-reality system 1700 may or may not include sensor 1740 or may include more than one sensor. In embodiments in which sensor 1740 includes an IMU, the IMU may generate calibration data based on measurement signals from sensor 1740. Examples of sensor 1740 may include, without limitation, accelerometers, gyroscopes, magnetometers, other suitable types of sensors that detect motion, sensors used for error correction of the IMU, or some combination thereof. Augmented-reality system 1700 may also include a microphone array with a plurality of acoustic transducers 1720 (A)-1720(J), referred to collectively as acoustic transducers 1720. Acoustic transducers 1720 may be transducers that detect air pressure variations induced by sound waves. Each acoustic transducer 1720 may be configured to detect sound and convert the detected sound into an electronic format (e.g., an analog or digital format). The microphone array in FIG. 2 may include, for example, ten acoustic transducers: 1720(A) and 1720(B), which may be designed to be placed inside a corresponding ear of the user, acoustic transducers 1720(C), 1720(D), 1720(E), 1720(F), 1720(G), and 1720 (H), which may be positioned at various locations on frame 1710, and/or acoustic transducers 1720(I) and 1720(J), which may be positioned on a corresponding neckband 1705.

In some embodiments, one or more of acoustic transducers 1720(A)-(F) may be used as output transducers (e.g., speakers). For example, acoustic transducers 1720(A) and/or 1720(B) may be earbuds or any other suitable type of headphone or speaker.

The configuration of acoustic transducers 1720 of the microphone array may vary. While augmented-reality system 1700 is shown in FIG. 17 as having ten acoustic transducers 1720, the number of acoustic transducers 1720 may be greater or less than ten. In some embodiments, using higher numbers of acoustic transducers 1720 may increase the amount of audio information collected and/or the sensitivity and accuracy of the audio information. In contrast, using a lower number of acoustic transducers 1720 may decrease the computing power required by the controller 1750 to process the collected audio information. In addition, the position of each acoustic transducer 1720 of the microphone array may vary. For example, the position of an acoustic transducer 1720 may include a defined position on the user, a defined coordinate on frame 1710, an orientation associated with each acoustic transducer, or some combination thereof.

Acoustic transducers 1720(A) and 1720(B) may be positioned on different parts of the user's ear, such as behind the pinna or within the auricle or fossa. Or, there may be additional acoustic transducers on or surrounding the ear in addition to acoustic transducers 1720 inside the ear canal. Having an acoustic transducer positioned next to an ear canal of a user may enable the microphone array to collect information on how sounds arrive at the ear canal. By positioning at least two of acoustic transducers 1720 on either side of a user's head (e.g., as binaural microphones), augmented-reality device 1700 may simulate binaural hearing and capture a 3D stereo sound field around about a user's head. In some embodiments, acoustic transducers 1720(A) and 1720(B) may be connected to augmented-reality system 1700 via a wired connection 1730, and in other embodiments, acoustic transducers 1720(A) and 1720(B) may be connected to augmented-reality system 1700 via a wireless connection (e.g., a Bluetooth connection). In still other embodiments, acoustic transducers 1720(A) and 1720(B) may not be used at all in conjunction with augmented-reality system 1700.

Acoustic transducers 1720 on frame 1710 may be positioned along the length of the temples, across the bridge, above or below display devices 1715(A) and 1715(B), or some combination thereof. Acoustic transducers 1720 may be oriented such that the microphone array is able to detect sounds in a wide range of directions surrounding the user wearing the augmented-reality system 1700. In some embodiments, an optimization process may be performed during manufacturing of augmented-reality system 1700 to determine relative positioning of each acoustic transducer 1720 in the microphone array.

In some examples, augmented-reality system 1700 may include or be connected to an external device (e.g., a paired device), such as neckband 1705. Neckband 1705 generally represents any type or form of paired device. Thus, the following discussion of neckband 1705 may also apply to various other paired devices, such as charging cases, smart watches, smart phones, wrist bands, other wearable devices, hand-held controllers, tablet computers, laptop computers and other external compute devices, etc.

As shown, neckband 1705 may be coupled to eyewear device 1702 via one or more connectors. The connectors may be wired or wireless and may include electrical and/or non-electrical (e.g., structural) components. In some cases, eyewear device 1702 and neckband 1705 may operate independently without any wired or wireless connection between them. While FIG. 17 illustrates the components of eyewear device 1702 and neckband 1705 in example locations on eyewear device 1702 and neckband 1705, the components may be located elsewhere and/or distributed differently on eyewear device 1702 and/or neckband 1705. In some embodiments, the components of eyewear device 1702 and neckband 1705 may be located on one or more additional peripheral devices paired with eyewear device 1702, neckband 1705, or some combination thereof.

Pairing external devices, such as neckband 1705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1700 may be provided by a paired device or shared between a paired device and an eyewear device, thus reducing the weight, heat profile, and form factor of the eyewear device overall while still retaining desired functionality. For example, neckband 1705 may allow components that would otherwise be included on an eyewear device to be included in neckband 1705 since users may tolerate a heavier weight load on their shoulders than they would tolerate on their heads. Neckband 1705 may also have a larger surface area over which to diffuse and disperse heat to the ambient environment. Thus, neckband 1705 may allow for greater battery and computation capacity than might otherwise have been possible on a stand-alone eyewear device. Since weight carried in neckband 1705 may be less invasive to a user than weight carried in eyewear device 1702, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1705 may be communicatively coupled with eyewear device 1702 and/or to other devices. These other devices may provide certain functions (e.g., tracking, localizing, depth mapping, processing, storage, etc.) to augmented-reality system 1700. In the embodiment of FIG. 17, neckband 1705 may include two acoustic transducers (e.g., 1720(1) and 1720(J)) that are part of the microphone array (or potentially form their own microphone subarray). Neckband 1705 may also include a controller 1725 and a power source 1735.

Acoustic transducers 1720(1) and 1720(J) of neckband 1705 may be configured to detect sound and convert the detected sound into an electronic format (analog or digital). In the embodiment of FIG. 17, acoustic transducers 1720(1) and 1720(J) may be positioned on neckband 1705, thereby increasing the distance between the neckband acoustic transducers 1720(1) and 1720(J) and other acoustic transducers 1720 positioned on eyewear device 1702. In some cases, increasing the distance between acoustic transducers 1720 of the microphone array may improve the accuracy of beamforming performed via the microphone array. For example, if a sound is detected by acoustic transducers 1720(C) and 1720(D) and the distance between acoustic transducers 1720(C) and 1720(D) is greater than, e.g., the distance between acoustic transducers 1720(D) and 1720(E), the determined source location of the detected sound may be more accurate than if the sound had been detected by acoustic transducers 1720(D) and 1720(E).

Controller 1725 of neckband 1705 may process information generated by the sensors on 1705 and/or augmented-reality system 1700. For example, controller 1725 may process information from the microphone array that describes sounds detected by the microphone array. For each detected sound, controller 1725 may perform a direction-of-arrival (DOA) estimation to estimate a direction from which the detected sound arrived at the microphone array. As the microphone array detects sounds, controller 1725 may populate an audio data set with the information. In embodiments in which augmented-reality system 1700 includes an inertial measurement unit, controller 1725 may compute all inertial and spatial calculations from the IMU located on eyewear device 1702. A connector may convey information between augmented-reality system 1700 and neckband 1705 and between augmented-reality system 1700 and controller 1725. The information may be in the form of optical data, electrical data, wireless data, or any other transmittable data form. Moving the processing of information generated by augmented-reality system 1700 to neckband 1705 may reduce weight and heat in eyewear device 1702, making it more comfortable to the user.

Power source 1735 in neckband 1705 may provide power to eyewear device 1702 and/or to neckband 1705. Power source 1735 may include, without limitation, lithium ion batteries, lithium-polymer batteries, primary lithium batteries, alkaline batteries, or any other form of power storage. In some cases, power source 1735 may be a wired power source. Including power source 1735 on neckband 1705 instead of on eyewear device 1702 may help better distribute the weight and heat generated by power source 1735.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1800 in FIG. 18, that mostly or completely covers a user's field of view. Virtual-reality system 1800 may include a front rigid body 1802 and a band 1804 shaped to fit around a user's head. Virtual-reality system 1800 may also include output audio transducers 1806(A) and 1806(B). Furthermore, while not shown in FIG. 18, front rigid body 1802 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1800 and/or virtual-reality system 1800 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1700 and/or virtual-reality system 1800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 1600, augmented-reality system 1700, and/or virtual-reality system 1800 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 16 and 18, output audio transducers 1608(A), 1608(B), 1806(A), and 1806(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1610 may include condenser microphones, dynamic microphones, ribbon microphones, and/or any other type or form of input transducer. In some embodiments, a single transducer may be used for both audio input and audio output.

Figure 18:
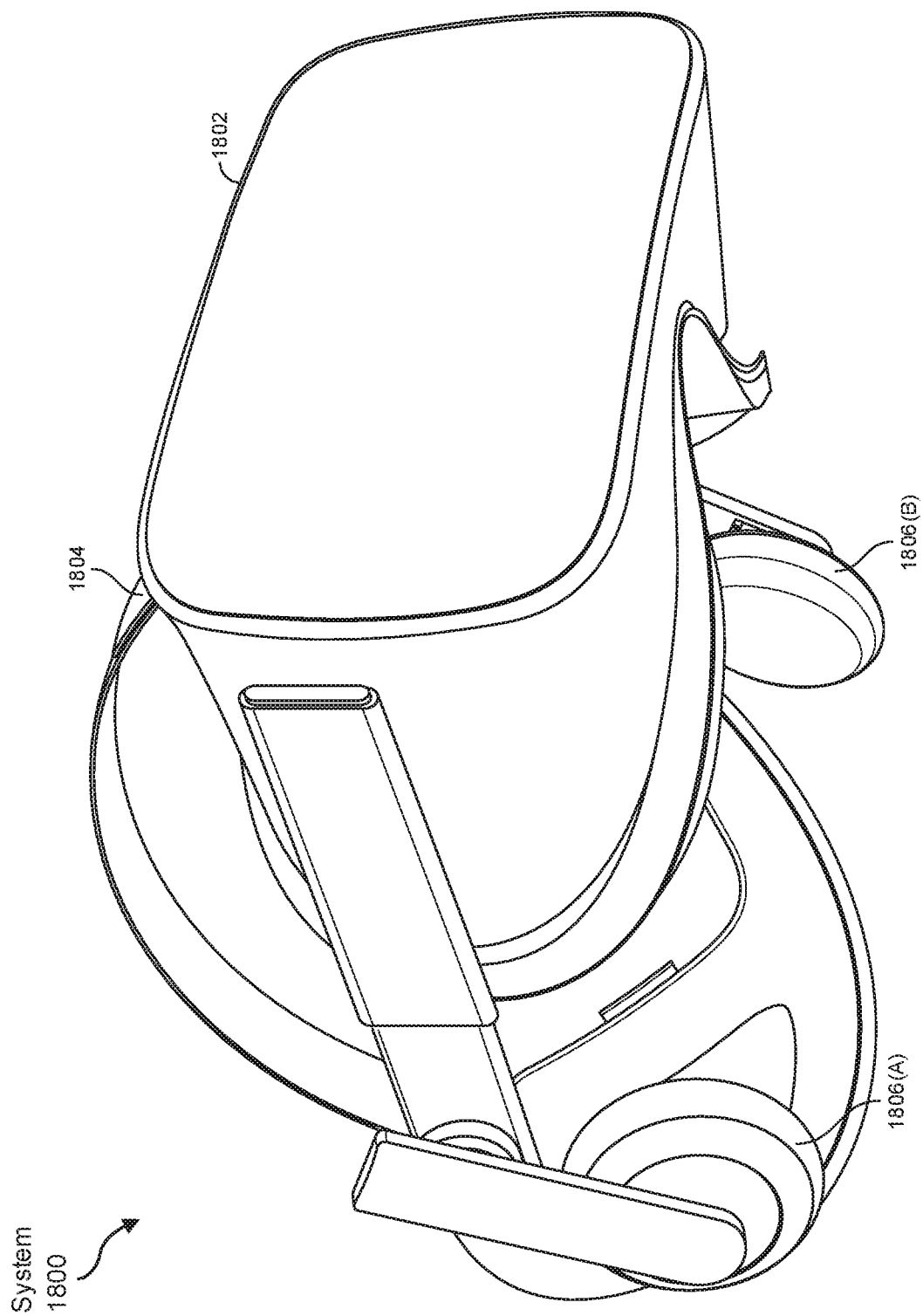
FIG. 18 is an illustration of an example virtual-reality headset that may be used in connection with embodiments of this disclosure.

While not shown in FIGS. 16-18, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 1600, 1700, and 1800 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 19:
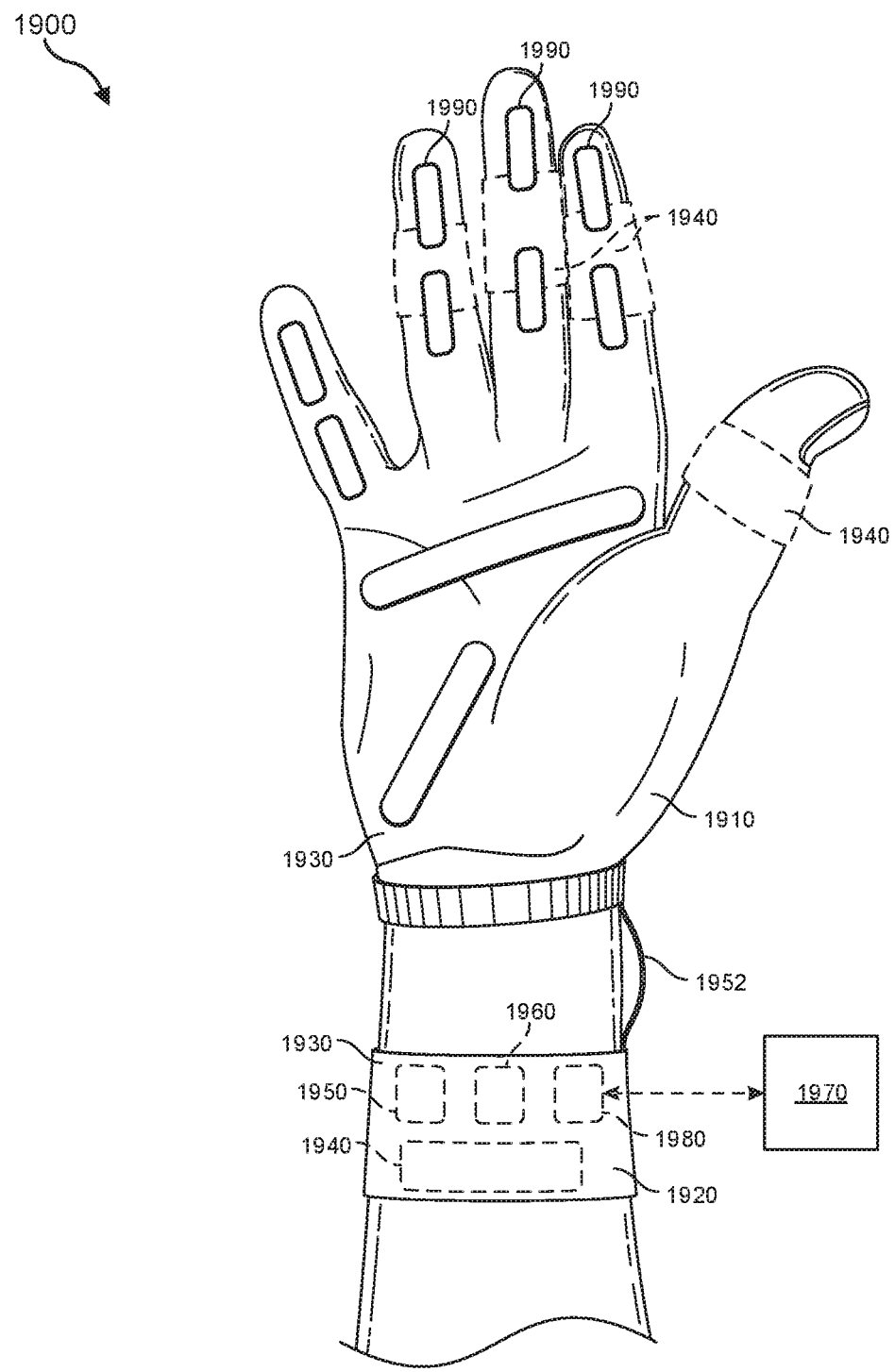
FIG. 19 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 19 illustrates a vibrotactile system 1900 in the form of a wearable glove (haptic device 1910) and wristband (haptic device 1920). Haptic device 1910 and haptic device 1920 are shown as examples of wearable devices that include a flexible, wearable textile material 1930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1940 may be positioned at least partially within one or more corresponding pockets formed in textile material 1930 of vibrotactile system 1900. Vibrotactile devices 1940 may be positioned in locations to provide a vibrating sensation (e.g., haptic feedback) to a user of vibrotactile system 1900. For example, vibrotactile devices 1940 may be positioned to be against the user's finger(s), thumb, or wrist, as shown in FIG. 19. Vibrotactile devices 1940 may, in some examples, be sufficiently flexible to conform to or bend with the user's corresponding body part(s).

A power source 1950 (e.g., a battery) for applying a voltage to the vibrotactile devices 1940 for activation thereof may be electrically coupled to vibrotactile devices 1940, such as via conductive wiring 1952. In some examples, each of vibrotactile devices 1940 may be independently electrically coupled to power source 1950 for individual activation. In some embodiments, a processor 1960 may be operatively coupled to power source 1950 and configured (e.g., programmed) to control activation of vibrotactile devices 1940.

Vibrotactile system 1900 may be implemented in a variety of ways. In some examples, vibrotactile system 1900 may be a standalone system with integral subsystems and components for operation independent of other devices and systems. As another example, vibrotactile system 1900 may be configured for interaction with another device or system 1970. For example, vibrotactile system 1900 may, in some examples, include a communications interface 1980 for receiving and/or sending signals to the other device or system 1970. The other device or system 1970 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1980 may enable communications between vibrotactile system 1900 and the other device or system 1970 via a wireless (e.g., Wi-Fi, Bluetooth, cellular, radio, etc.) link or a wired link. If present, communications interface 1980 may be in communication with processor 1960, such as to provide a signal to processor 1960 to activate or deactivate one or more of the vibrotactile devices 1940.

Vibrotactile system 1900 may optionally include other subsystems and components, such as touch-sensitive pads 1990, pressure sensors, motion sensors, position sensors, lighting elements, and/or user interface elements (e.g., an on/off button, a vibration control element, etc.). During use, vibrotactile devices 1940 may be configured to be activated for a variety of different reasons, such as in response to the user's interaction with user interface elements, a signal from the motion or position sensors, a signal from the touch-sensitive pads 1990, a signal from the pressure sensors, a signal from the other device or system 1970, etc.

Although power source 1950, processor 1960, and communications interface 1980 are illustrated in FIG. 19 as being positioned in haptic device 1920, the present disclosure is not so limited. For example, one or more of power source 1950, processor 1960, or communications interface 1980 may be positioned within haptic device 1910 or within another wearable textile.

Figure 20:
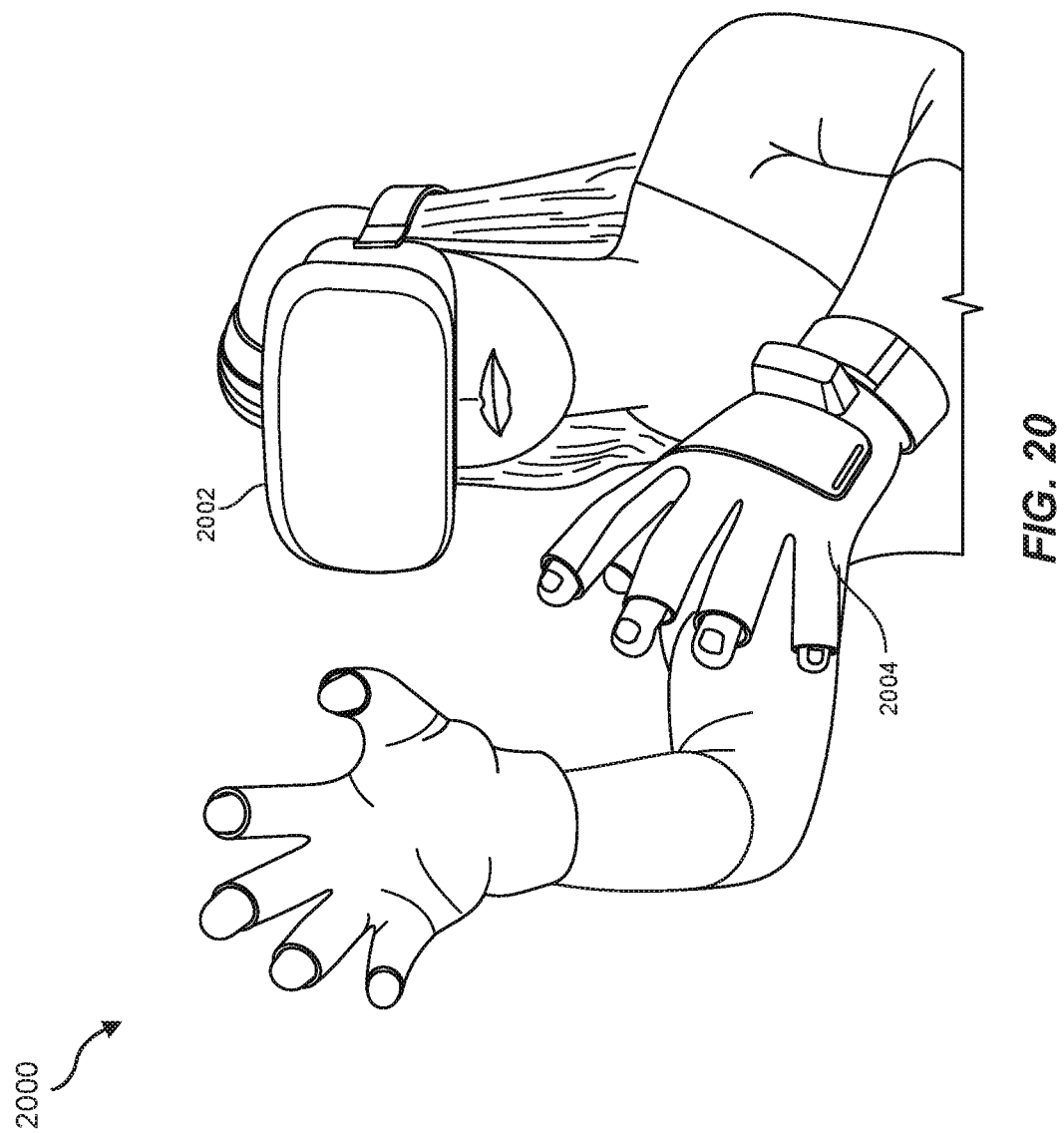
FIG. 20 is an illustration of an example virtual-reality environment according to embodiments of this disclosure.

Haptic wearables, such as those shown in and described in connection with FIG. 19, may be implemented in a variety of types of artificial-reality systems and environments. FIG. 20 shows an example artificial reality environment 2000 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 2002 generally represents any type or form of virtual-reality system, such as virtual-reality system 1800 in FIG. 18. Haptic device 2004 generally represents any type or form of wearable device, worn by a use of an artificial reality system, that provides haptic feedback to the user to give the user the perception that he or she is physically engaging with a virtual object. In some embodiments, haptic device 2004 may provide haptic feedback by applying vibration, motion, and/or force to the user. For example, haptic device 2004 may limit or augment a user's movement. To give a specific example, haptic device 2004 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 2004 to send action requests to a console. Examples of action requests include, without limitation, requests to start an application and/or end the application and/or requests to perform a particular action within the application.

Figure 21:
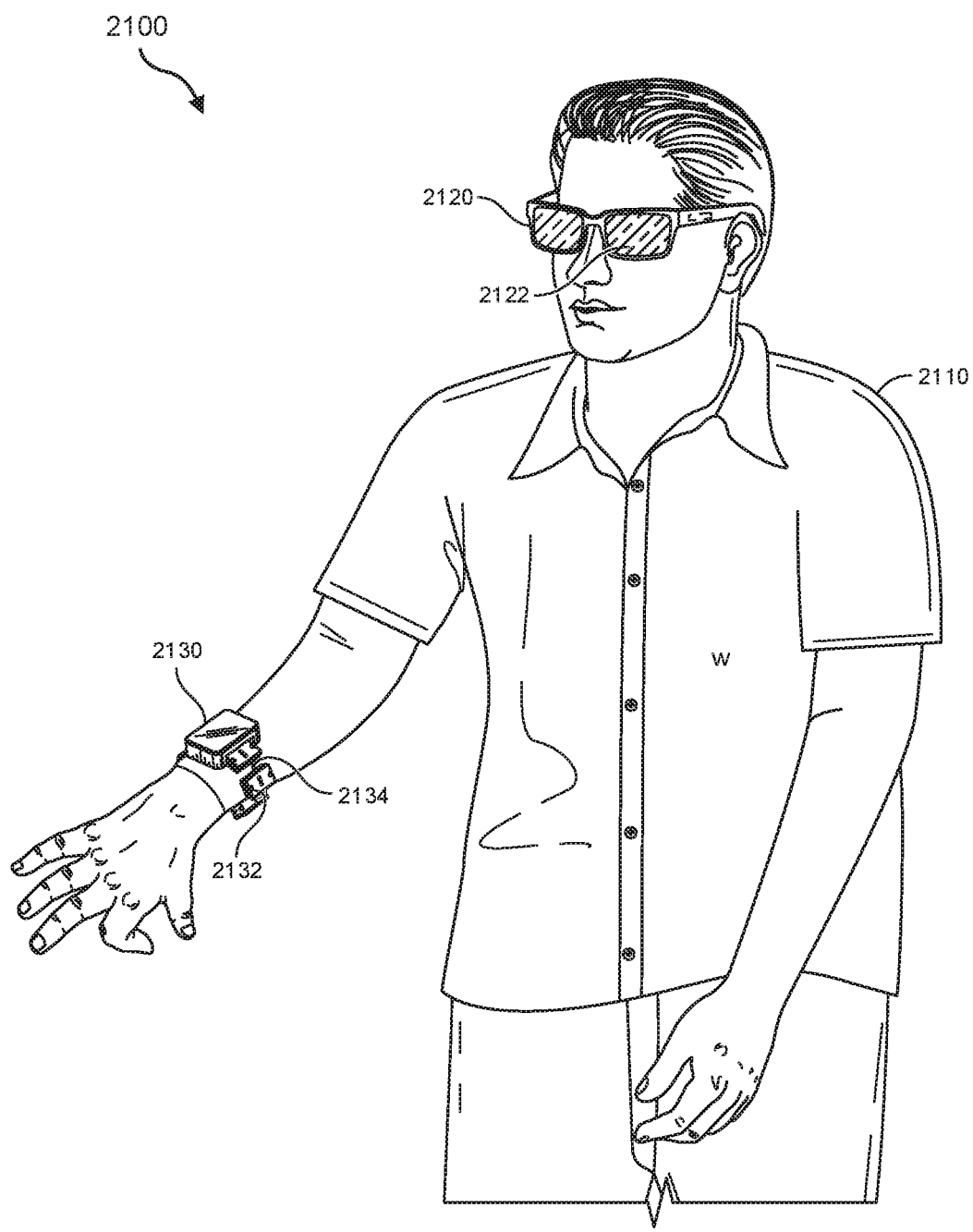
FIG. 21 is an illustration of an example augmented-reality environment according to embodiments of this disclosure.

While haptic interfaces may be used with virtual-reality systems, as shown in FIG. 20, haptic interfaces may also be used with augmented-reality systems, as shown in FIG. 21. FIG. 21 is a perspective view a user 2110 interacting with an augmented-reality system 2100. In this example, user 2110 may wear a pair of augmented-reality glasses 2120 that have one or more displays 2122 and that are paired with a haptic device 2130. Haptic device 2130 may be a wristband that includes a plurality of band elements 2132 and a tensioning mechanism 2134 that connects band elements 2132 to one another.

One or more of band elements 2132 may include any type or form of actuator suitable for providing haptic feedback. For example, one or more of band elements 2132 may be configured to provide one or more of various types of cutaneous feedback, including vibration, force, traction, texture, and/or temperature. To provide such feedback, band elements 2132 may include one or more of various types of actuators. In one example, each of band elements 2132 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1910, 1920, 2004, and 2130 may include any suitable number and/or type of haptic transducer, sensor, and/or feedback mechanism. For example, haptic devices 1910, 1920, 2004, and 2130 may include one or more mechanical transducers, piezoelectric transducers, and/or fluidic transducers. Haptic devices 1910, 1920, 2004, and 2130 may also include various combinations of different types and forms of transducers that work together or independently to enhance a user's artificial-reality experience. In one example, each of band elements 2132 of haptic device 2130 may include a vibrotactor (e.g., a vibrotactile actuator) configured to vibrate in unison or independently to provide one or more of various types of haptic sensations to a user The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. An apparatus comprising:
   a fluidic channel connecting an inlet port and an outlet port;
   an enclosed interstitial region defined between a first separation element and a second separation element, wherein the first separation element is located between the fluidic channel and an interstitial region;
   a fluid port open to the interstitial region; and a gate transmission element disposed in the interstitial region, the gate transmission element having a centralized cavity and at least one protruding element configured such that the at least one protruding element limits fluid flow between the inlet port and the outlet port by forcing a portion of the first separation element into the fluidic channel;

at least one gate terminal connected to a second fluidic inlet port, wherein pressure or force at the at least one gate terminal at least partially controls movement of the gate transmission element.

2. The apparatus of claim 1, wherein the at least one gate terminal comprises a primary gate terminal and a secondary gate terminal.

3. The apparatus of claim 1, wherein at least one of the first separation element or the second separation element is disposed between the interstitial region and the at least one gate terminal at least partially isolating fluid in a restriction region of the at least one gate terminal.

4. The apparatus of claim 1, wherein one or more fluidic channels connect the at least one gate terminal to one or more locations in the fluidic channel of the apparatus.

5. The apparatus of claim 1, wherein one or more fluidic channels connect the fluidic channel of the apparatus to a gate terminal of a second, different apparatus.

6. The apparatus of claim 1, wherein one or more fluidic channels connect the at least one gate terminal of the apparatus to a gate terminal of a second, different apparatus.

7. The apparatus of claim 1, wherein one or more fluidic channels connect the fluidic channel of the first apparatus to a fluidic channel of a second, different apparatus.

8. The apparatus of claim 7, wherein pressure or force at the at least one gate terminal at least partially controls movement of a gate transmission element of the second, different apparatus.

9. The apparatus of claim 1, wherein the apparatus comprises a normally open fluidic control valve, and wherein a pressure or force applied to the gate transmission element is modulated by a pressure or force at the at least one gate terminal.

10. The apparatus of claim 1, wherein the at least one gate terminal at least partially modulates the force at which the at least one protruding element of the gate transmission element presses on the first separation element.

11. The apparatus of claim 10, wherein a downward threshold for modulating the force and an upward threshold for modulating the force are controlled by adjusting a preload pressure or force.

12. The apparatus of claim 1, wherein the apparatus comprises a normally closed fluidic control valve in which a preload force is applied to the gate transmission element, causing the gate transmission element to move sufficiently to limit fluid from flowing from the inlet port to the outlet port.

13. The apparatus of claim 1, further comprising one or more pressure sensors configured to detect pressure at one or more locations within the apparatus and/or one or more flow sensors configured to detect fluid flow at one or more locations within the apparatus.

14. The apparatus of claim 13, wherein input pressure at at least one of the inlet port, the outlet port, or the at least one gate terminal is altered based on detected pressure measurements from one or more of the pressure sensors.

15. A method for using force or displacement to adjust fluid flow in a fluidic control valve, comprising:

detecting an amount of pressure or force at a primary gate terminal or at a secondary gate terminal of the fluidic control valve, the fluidic control valve including:

an enclosed interstitial region defined between a first separation element and a second separation element, wherein the first separation element is located between an interstitial region and a fluidic channel connecting an inlet port and an outlet port;

a fluid port open to the interstitial region; and a gate transmission element disposed in the interstitial region, the gate transmission element having a centralized cavity and at least one protruding element configured such that the at least one protruding element limits fluid flow between the inlet port and the outlet port by forcing a portion of the first separation element into the fluidic channel; and at least partially controlling the amount of pressure or force at the primary gate terminal and/or at the secondary gate terminal.

16. The method of claim 15, wherein applying pressure or force at the primary gate terminal increases force on the gate transmission element, restricting fluid flow through a restriction region of the fluidic channel, and wherein applying pressure or force at the secondary gate terminal reduces force on the gate transmission element, allowing an increased amount of fluid to flow through the restriction region of the fluidic channel.

17. The method of claim 15, further comprising:

receiving an indication that the gate transmission element is to be moved a specified amount; and increasing or decreasing pressure or force at at least one of the primary gate terminal or the secondary gate terminal to cause the gate transmission element to move by the specified amount.

18. The method of claim 15, wherein an amount of force applied to the gate transmission element at at least one of the primary gate terminal or the secondary gate terminal is supplied by an input pressure or force.

19. The method of claim 15, wherein an amount of force applied by the gate transmission element to the first separation element is substantially proportional to an amount of input pressure or force applied at each gate terminal separately.

20. The method of claim 15, wherein increased pressure or force applied at the primary gate terminal increases force on the gate transmission element, and wherein increased pressure or force applied at the secondary gate terminal decreases force on the gate transmission element.

21. The method of claim 15, wherein an amount of force applied by the gate transmission element is substantially proportional to the difference in pressure or force at the primary gate terminal and the secondary gate terminal.

22. The method of claim 15, wherein feedback from a second fluidic control valve is implemented to at least partially control the gate transmission element.

23. The method of claim 15, wherein at least one of the inlet port or the outlet port is implemented to at least partially control gate pressures or forces in the fluidic control valve.

24. A system for using force or displacement to adjust fluid flow in a fluidic control valve, comprising:

a pressure detector detecting an amount of pressure at a primary gate terminal or at a secondary gate terminal of the fluidic control valve, the fluidic control valve including:

an enclosed interstitial region defined between a first separation element and a second separation element, wherein the first separation element is located between an interstitial region and a fluidic channel connecting an inlet port and an outlet port;

a fluid port open to the interstitial region; and a gate transmission element disposed in the interstitial region, the gate transmission element having a centralized cavity and at least one protruding element configured such that the at least one protruding element limits fluid flow between the inlet port and the outlet port by forcing a portion of the first separation element into the fluidic channel; and a controller controlling the amount of pressure at the primary gate terminal and/or at the secondary gate terminal.

25. The system of claim 24, wherein at least one of the first separation element or the second separation element is disposed between the interstitial region and at least one of the primary gate terminal or the secondary gate terminal.

26. The system of claim 24, wherein pressure at the primary gate terminal and/or the secondary gate terminal is at least partially controlled by fluid pressure from the fluidic control valve or from one or more other fluidic control valves, and wherein the primary and/or secondary gate terminals and the fluid control valves are linked together via fluidic channels.

27. The system of claim 26, wherein pressure at the primary gate terminal and/or the secondary gate terminal at least partially determines the pressure in one or more locations in the fluidic control valve or in a plurality of different fluidic control valves, and wherein the primary and/or secondary gate terminals and the fluidic control valves are linked together via fluidic channels.

* * * * *